(12) United States Patent
Kwon et al.

(10) Patent No.: US 10,534,453 B2
(45) Date of Patent: Jan. 14, 2020

(54) MOBILE TERMINAL AND MOBILE TERMINAL CONTROL METHOD

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/747,388

(22) PCT Filed: Jul. 24, 2015

(86) PCT No.: PCT/KR2015/007755
§ 371 (c)(1),
(2) Date: Jan. 24, 2018

(87) PCT Pub. No.: WO2017/018551
PCT Pub. Date: Feb. 2, 2017

(65) Prior Publication Data
US 2018/0217679 A1     Aug. 2, 2018

(30) Foreign Application Priority Data

Jul. 24, 2015   (KR) .......................... 10-2015-0104746

(51) Int. Cl.
*G06F 3/038*       (2013.01)
*G06F 3/041*       (2006.01)
(Continued)

(52) U.S. Cl.
CPC .............. *G06F 3/038* (2013.01); *G06F 3/041* (2013.01); *G06F 3/0412* (2013.01);
(Continued)

(58) Field of Classification Search
None
See application file for complete search history.

(56) References Cited

U.S. PATENT DOCUMENTS

2008/0086925 A1    4/2008  Yang
2008/0303782 A1*  12/2008  Grant .................... G06F 1/1615
                                                                  345/156

(Continued)

FOREIGN PATENT DOCUMENTS

KR    10-2010-0041733 A    4/2010
KR    10-2014-0025231 A    3/2014
(Continued)

*Primary Examiner* — Gustavo Polo
(74) *Attorney, Agent, or Firm* — Birch, Stewart, Kolasch & Birch, LLP

(57) ABSTRACT

A mobile terminal including a rollable display; a first housing supporting a first end of the display and a second housing supporting a second end of the display; a sensing unit configured to sense variations in rolling of the display according to a distance between the first housing and the second housing; and a controller configured to release a locked state of the display when an input pattern matching a predetermined unlocking pattern is input while the display is rolled out from the first housing. Further, the state in which the display is fully rolled up is a state in which the first housing and the second housing are in contact with each other and the display is not exposed to the outside.

18 Claims, 31 Drawing Sheets

(51) Int. Cl.
  *G06F 3/0488* (2013.01)
  *G06F 3/16* (2006.01)
  *G06F 21/36* (2013.01)
  *G06K 9/00* (2006.01)
  *H04M 1/725* (2006.01)
  *G06F 3/0484* (2013.01)
  *H04M 1/02* (2006.01)
  *G06F 21/31* (2013.01)
  *G06F 3/01* (2006.01)
  *G06F 3/0481* (2013.01)

(52) U.S. Cl.
  CPC ........ *G06F 3/0484* (2013.01); *G06F 3/04883* (2013.01); *G06F 3/04886* (2013.01); *G06F 3/167* (2013.01); *G06F 21/31* (2013.01); *G06F 21/36* (2013.01); *G06K 9/00006* (2013.01); *G06K 9/00013* (2013.01); *G06K 9/00885* (2013.01); *H04M 1/0268* (2013.01); *H04M 1/72519* (2013.01); *H04M 1/72583* (2013.01); *G06F 3/016* (2013.01); *G06F 3/04817* (2013.01); *G06F 2203/04102* (2013.01)

(56) References Cited

U.S. PATENT DOCUMENTS

| | | | |
|---|---|---|---|
| 2011/0187497 A1* | 8/2011 | Chin | G06F 21/00 340/5.54 |
| 2011/0193829 A1* | 8/2011 | Tsai | G02F 1/133305 345/204 |
| 2013/0127917 A1* | 5/2013 | Kwack | G06F 1/1652 345/660 |

FOREIGN PATENT DOCUMENTS

| | | |
|---|---|---|
| KR | 10-2014-0108919 A | 9/2014 |
| KR | 10-2015-0065543 A | 6/2015 |

* cited by examiner

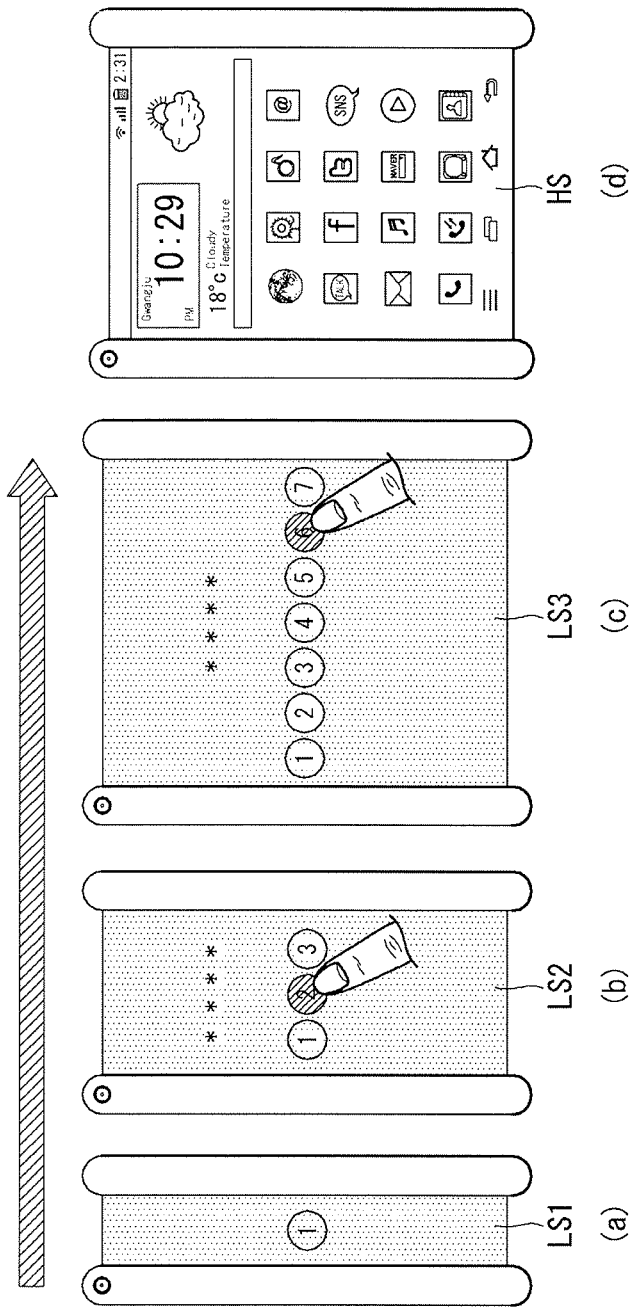

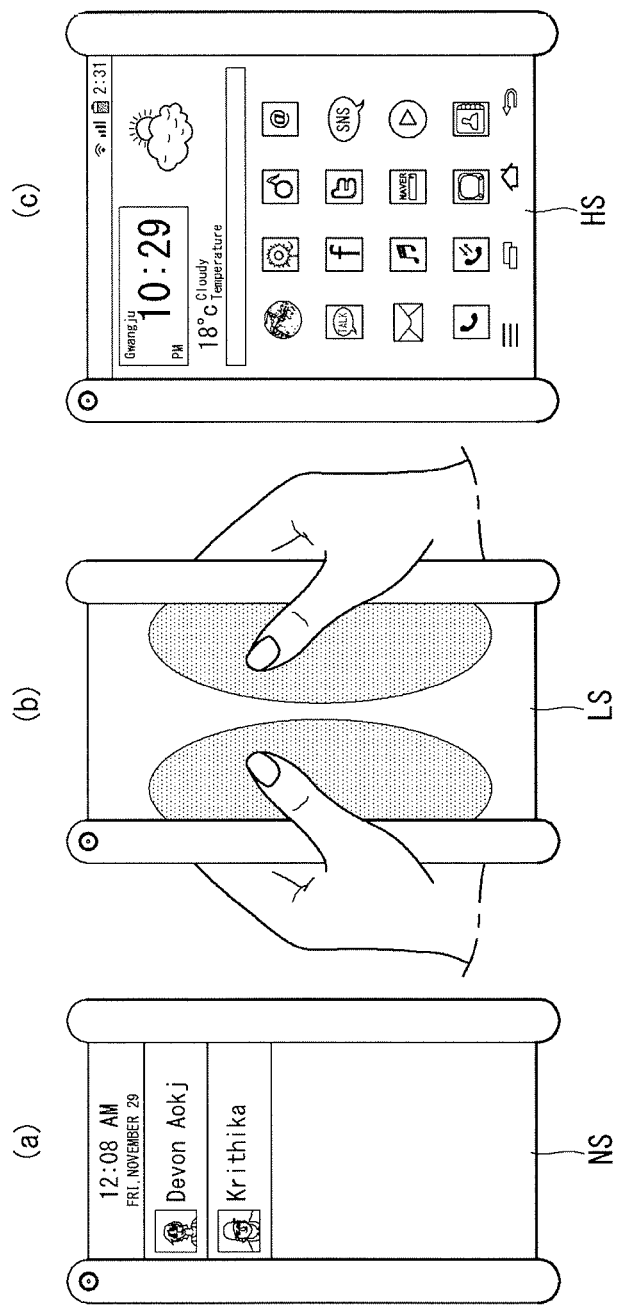

MOBILE TERMINAL AND MOBILE TERMINAL CONTROL METHOD

CROSS-REFERENCE TO THE RELATED APPLICATIONS

This application is the National Phase of PCT International Application No. PCT/KR2015/007755, filed on Jul. 24, 2015, which claims priority under 35 U.S.C. 119(a) to Patent Application No. 10-2015-0104746, filed in Republic of Korea on Jul. 24, 2015, all of which are hereby expressly incorporated by reference into the present application.

BACKGROUND OF THE INVENTION

Field

The present invention relates to a mobile terminal including a rollable display and a control method thereof.

Discussion of the Background Art

With the recent development of display related technology, display devices which can be deformed when used in a manner of being folded, rolled or flexibly stretched in at least one direction are researched and developed. Such displays can be deformed in various forms and thus can meet both demand for a large display in the stage of use and demand for a small display for portability.

Meanwhile, deformable display devices can be deformed into various forms at the request of a user or according to a situation in which they are used as well as a preset form. Accordingly, when a display area of a display is fixed, it may be inconvenient to use the display device, and thus it is necessary to recognize a changed form of the display and control the display area of the display.

With the development of display technology, user interfaces which have been provided through a rigid display for operating portable terminals can evolve into various forms in portable terminals having a rollable display.

SUMMARY OF THE INVENTION

An object of the present invention is to provide a mobile terminal providing a user interface through which a mobile terminal having a rollable display can be controlled easily and efficiently, and a control method thereof.

Another object of the present invention is to provide a mobile terminal which can differentiate screen composition provided to a rollable display depending on degrees of rolling and rolling out of the rollable display to improve utilization of the rollable display, and a control method thereof.

Still another object of the present invention is to provide a mobile terminal which can release a locked state more easily and conveniently using a new unlock pattern to which properties of a rollable display are applied when the mobile terminal is in a lock mode, and a control method thereof.

Yet another object of the present invention is to provide a mobile terminal which can enhance security of a rollable display and release a locked state more easily and conveniently by using a rolling pattern and a rolling-out pattern of the rollable display for an unlock pattern, and a control method thereof.

Further another object of the present invention is to provide a mobile terminal providing a user interface which enables a user to directly access a desired screen or a desired application execution screen by differentiating screen composition upon rolling out of a rollable display, and a control method thereof.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

A mobile terminal according to one aspect of the present invention includes: a rollable display; a first housing and a second housing configured to respectively support both ends of the display; a sensing unit configured to sense variations in rolling and rolling out of the display according to the distance between the first housing and the second housing separated from the first housing; and a controller configured to release a locked state of the display when an input pattern sensed to release the locked state matches a prestored unlocking pattern when the display fully rolled up and accommodated in the first housing is rolled out.

The controller may be configured to display at least one application icon having notification information on the display when the display fully rolled up and accommodated in the first housing is rolled out by a predetermined distance.

When the locked state is released in a state in which one of the at least one application icon has been selected, the controller may be configured to display a screen provided by the selected application icon on the display.

The controller may be configured to display a screen through which an unlocking pattern will be input on the display when the display is additionally rolled out beyond the predetermined distance.

The display may include virtual areas arranged in a low, and the sensed input pattern may include a plurality of touch inputs of sequentially touching at least one of the virtual areas in a predetermined order whenever the display is rolled out in a process of discontinuously rolling out the display a predetermined number of times.

The predetermined unlocking pattern may be defined by the order of touching the virtual areas according to a rolling distance of the display, and the order may be preset through user input.

The number of virtual areas may be the same as the predetermined number of times of discontinuously rolling out the display.

The predetermined unlocking pattern may include a plurality of rolling patterns sensed when the display is discontinuously rolled, and the plurality of rolling patterns may be defined by a combination of a rolling distance, a rolling direction and the number of times of rolling.

The combination may further include a rolling speed.

When each of the plurality of rolling patterns matches the unlocking pattern, the controller may be configured to output a feedback signal whenever each rolling pattern is sensed.

The feedback signal may include at least one of a vibration signal, a sound signal and an optical signal.

When the display is rolled out by a predetermined distance in a closed state in which the display is fully rolled up and accommodated in the first housing, one or more application icons may be arranged in a low and displayed on the display, and when the locked state is released by the plurality of rolling patterns while a specific application icon is selected, an execution screen with respect to the selected specific application icon may be displayed on the display.

The display may further include a fingerprint recognition module, wherein the controller is configured to release the locked state upon sensing rolling out of the display even if the input pattern for releasing the locked state is not received after acquisition of fingerprint information of a user through the fingerprint recognition module, and to control the mobile terminal to operate in a mode in which the mobile terminal is accessible by the user only.

The controller may be configured to provide a user interface for receiving the input pattern for releasing the locked state on the display and to release the locked state when the unlocking pattern is input through the interface.

The mobile terminal may further include a grip sensing unit, wherein the controller is configured to sense the position of a hand gripping the first housing and the second housing through the grip sensing unit and to control the position of the user interface such that the unlocking pattern can be input by the hand.

The sensed input pattern may be defined by a plurality of touch inputs applied to at least one graphical object continuously exposed in a row direction when the display is rolled out.

The display may switch from one of a closed state in which the display is fully rolled up and accommodated in the first housing, an open state in which the display is fully rolled out, and an intermediate state in which at least part of the display is rolled out to another state according to a degree to which the display is rolled out, and the controller may be configured to sense the input pattern for releasing the locked state in the intermediate state.

The first housing may further include a roll on which the display is rolled.

A touch sensing panel may be integrated into the rollable display.

A method of controlling a mobile terminal according to another aspect of the present invention includes: sensing a state in which a fully rolled up rollable display is rolled out; sensing an input pattern for releasing a locked state of the display when the display is rolled out; and releasing the locked state when the sensed input pattern matches a preset unlocking pattern.

The method may further include: displaying a notification view screen providing at least one application icon having notification information on the display when the display is rolled out by a first distance; sensing the input pattern for releasing the locked state when the display is rolled out beyond the first distance; and displaying an unlocked screen on the display when the input pattern matches the preset unlocking pattern, according to a degree to which the display is rolled out.

The following effects can be obtained according to the mobile terminal and the control method thereof according to the present invention.

According to the present invention, it is possible to provide a user interface through which a mobile terminal having a rollable display can be controlled easily and efficiently.

According to the present invention, it is possible to differentiate screen composition provided to the rollable display depending on degrees of rolling and rolling out of the rollable display to improve utilization of the rollable display.

According to the present invention, it is possible to release a locked state more easily and conveniently using a new unlock pattern to which properties of a rollable display are applied when the mobile terminal is in a lock mode.

According to the present invention, it is possible to release a lock mode without additional touch input by using a rolling pattern and a rolling-out pattern of the rollable display for an unlock pattern when the mobile terminal is in the lock mode. Accordingly, security of the rollable display can be enhanced and a locked state can be released more easily and conveniently.

According to the present invention, it is possible to provide a user interface which enables a user to directly access a desired screen or a desired application execution screen by differentiating screen composition upon rolling out of a rollable display.

BRIEF DESCRIPTION OF THE DRAWINGS

FIG. 1B illustrates a state in which the rollable display is fully rolled out.

FIG. 1C illustrates a state in which an effective display area increases or decreases according to rolling or rolling out of the rollable display.

FIG. 1D illustrates a closed state in which the rollable display is fully rolled into a housing.

FIG. 2A is a cross-sectional view of a mobile terminal having a rollable display.

FIG. 2B is a plan view of a transparent display.

FIG. 2C is a cross-sectional view taken along line A-A' of FIG. 2B in a state in which the transparent display is rolled out.

FIG. 2D is a diagram for describing an operation of sensing a rolling state of the rollable display in the mobile terminal.

FIGS. 15A to 15D are diagrams for describing an example in which a control method of a mobile terminal according to a fifth embodiment of the present invention is implemented.

FIGS. 16A to 17B are diagrams for describing an example in which a control method of a mobile terminal according to a sixth embodiment of the present invention is implemented.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another. It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "includes" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
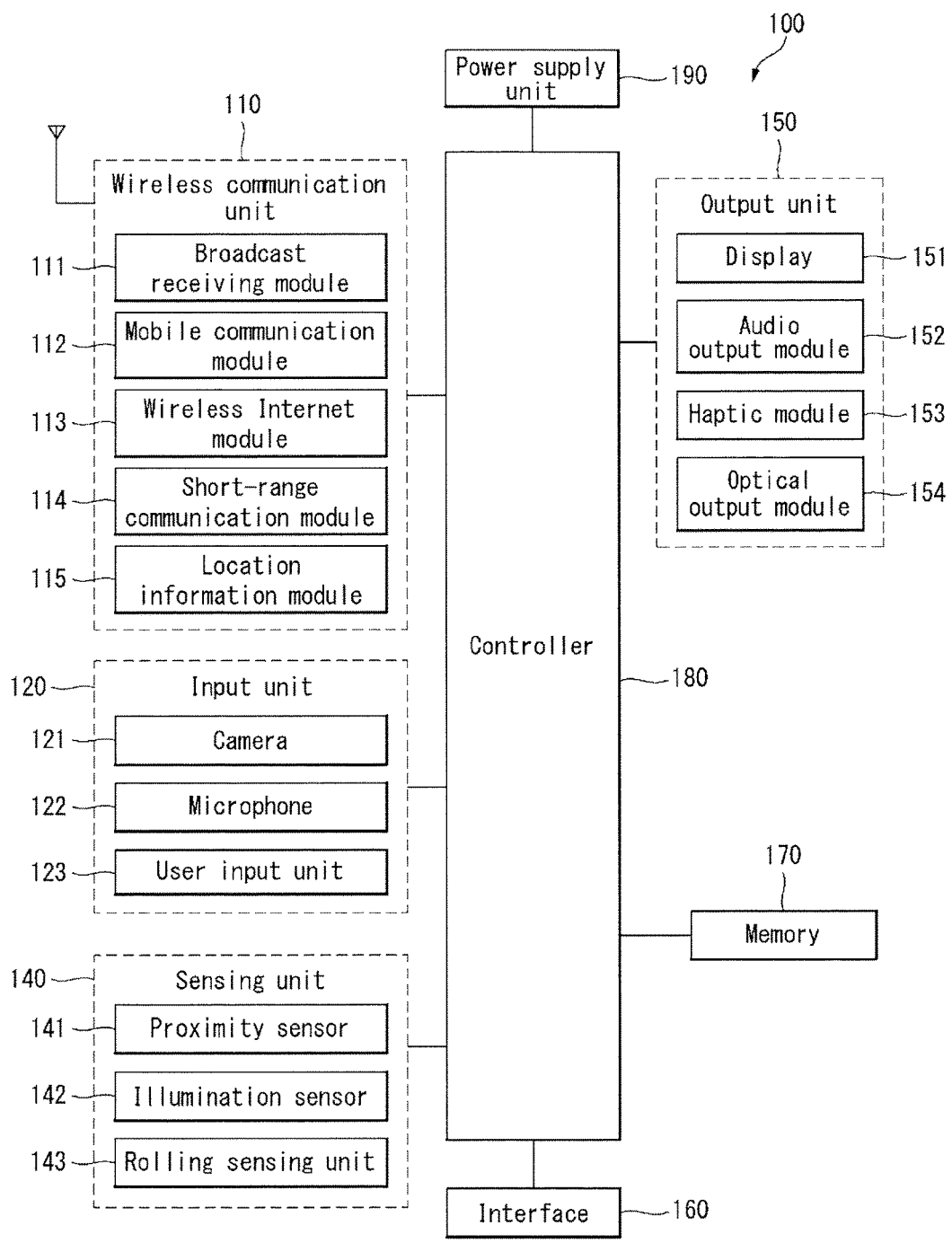
FIG. 1A is a block diagram of a mobile terminal in accordance with the present disclosure.
Figure 1B:
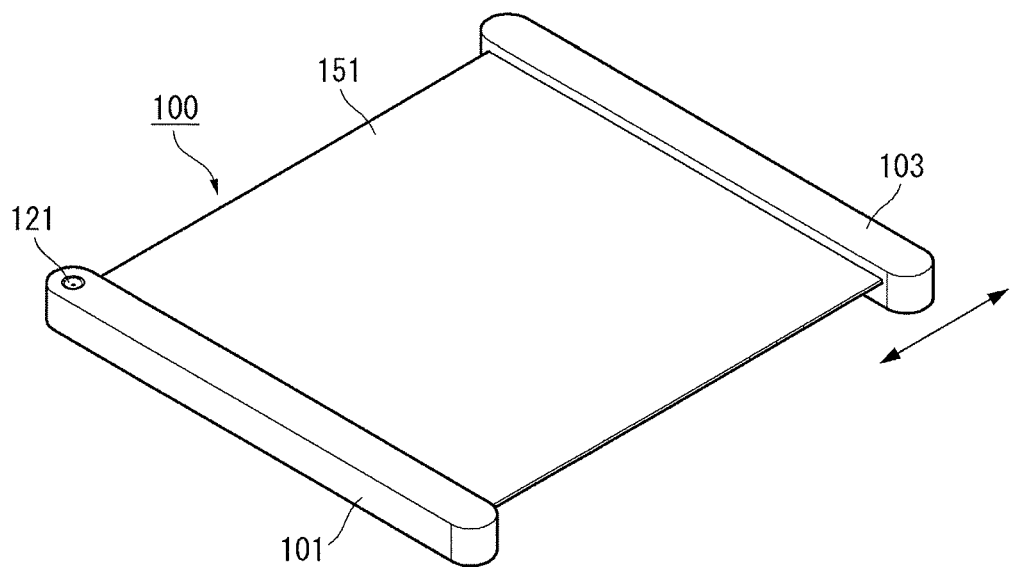
FIGS. 1B to 1D illustrate a mobile terminal having a rollable display.
Figure 1C:
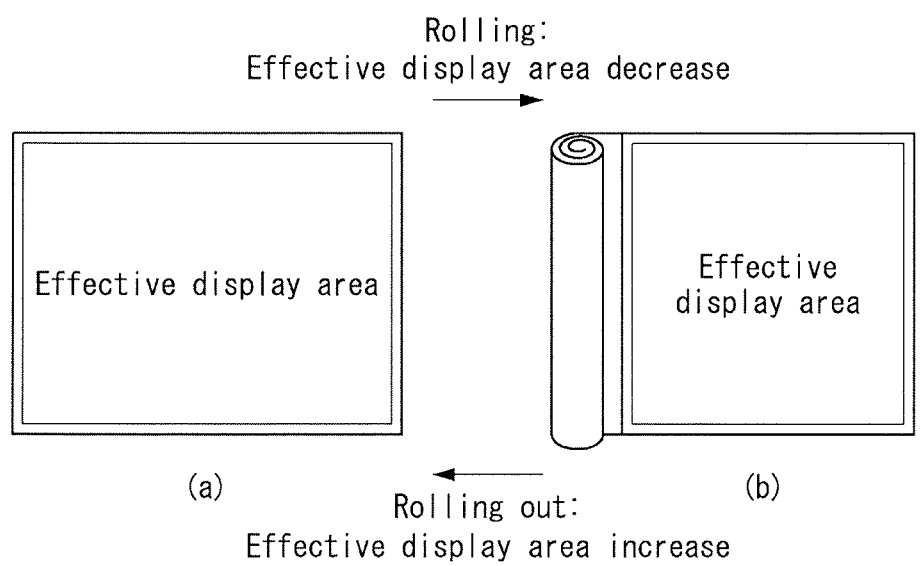
Figure 1D:
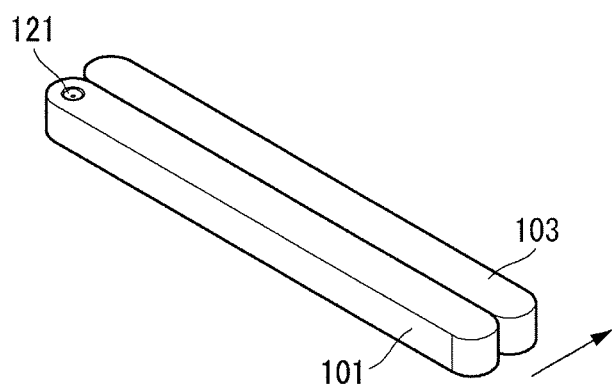

Reference is now made to FIGS. 1A to 1D, where FIG. 1A is a block diagram of a mobile terminal in accordance with the present disclosure, and FIG. 1B illustrates a state in which the rollable display is fully rolled out, FIG. 1C illustrates a state in which an effective display area increases or decreases according to rolling or rolling out of the rollable display, and FIG. 1D illustrates a closed state in which the rollable display is fully rolled into a housing.

Referring to FIG. 1A, the mobile terminal 100 is shown having components such as a wireless communication unit 110, an input unit 120, a sensing unit 140, an output unit 150, an interface 160, a memory 170, a controller 180, and a power supply unit 190. It is understood that implementing all of the illustrated components is not a requirement, and that greater or fewer components may alternatively be implemented.

More specifically, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141, an illumination sensor 142 and a rolling sensing unit 143. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface 160 serves as an interface with various types of external devices that can be coupled to the mobile terminal 100. The interface 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170.

In addition, the controller 180 can control at least some of the components described with reference to FIG. 1A to execute application programs stored in the memory 170. Furthermore, the controller 180 can operate at least two components included in the mobile terminal 100 in order to execute the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the aforementioned components may operate in cooperation to implement operations, control or control methods of mobile terminals according to various embodiments which will be described below. In addition, operations, control or control methods of mobile terminals may be implemented by executing at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile tell final 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The display unit 151 of the mobile terminal according to an embodiment of the present invention includes a transparent display, and the display unit 151 will be called a transparent display 151 in description of the structure of the mobile terminal 100 and description of embodiments.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface 160 serves as an interface for external devices to be connected with the mobile terminal 100. For example, the interface 160 can receive data transmitted from an external device, receive power to transfer to elements and components within the mobile terminal 100, or transmit internal data of the mobile terminal 100 to such external device. The interface 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface 160.

When the mobile terminal 100 is connected with an external cradle, the interface 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

FIG. 1B illustrates a state in which a rollable display is fully rolled out. Referring to FIG. 1B, the mobile terminal 100 according to an embodiment of the present invention includes a first housing 101, a second housing 103, and a rollable display 151 both ends of which are supported by the first housing 101 and the second housing 103.

A first camera 121 may be further provided to the front side of the first housing 101. Further, a second camera may be further provided to the rear side of the first housing 101, and the first camera and the second camera may capture images in opposite directions. In addition, the first camera and the second camera may have different pixels. At least some or all of the components shown in FIG. 1A may be included in the first housing 101 and/or the second housing 103.

One end of the display 151 may be rolled into the first housing 101 and the other end of the display 151 may be supported by the second housing 103. FIG. 1B shows a state in which at least part of the display 151 fully rolled into the first housing 101 is rolled out and exposed to the outside as the second housing 103 is separated from the first housing 101. A state in which the second housing 103 is fully separated from the first housing 101 and thus the display 151 is fully rolled out is called a mobile terminal open state.

FIG. 1C illustrates a state in which an effective display area increases or decreases according to rolling or rolling out of the rollable display. When the rollable display 151 switches from state (a) shown in FIG. 1C to state (b) shown in FIG. 1C, the area of the effective display area of the rollable display 151 decreases. When the rollable display 151 switches from state (b) to state (a) shown in FIG. 1C, the area of the effective display area of the rollable display 151 increases. That is, in the mobile terminal 100 according to the present invention, the area of the effective display area which is a substantial area in which image data can be displayed can be varied according to rolling and rolling out of the rollable display 151.

FIG. 1D illustrates a state in which the rollable display is fully rolled into the housing. In this case, a state in which the first housing 101 and the second housing 103 are in contact with each other and thus the rollable display 151 is not exposed to the outside will be called a closed state. Since the display 151 is not exposed in the closed state of the mobile terminal 100, the exterior of the mobile terminal 100 is defined by the first housing 101 and the second housing 103 only and portability of the mobile terminal 100 is improved.

Figure 2A:
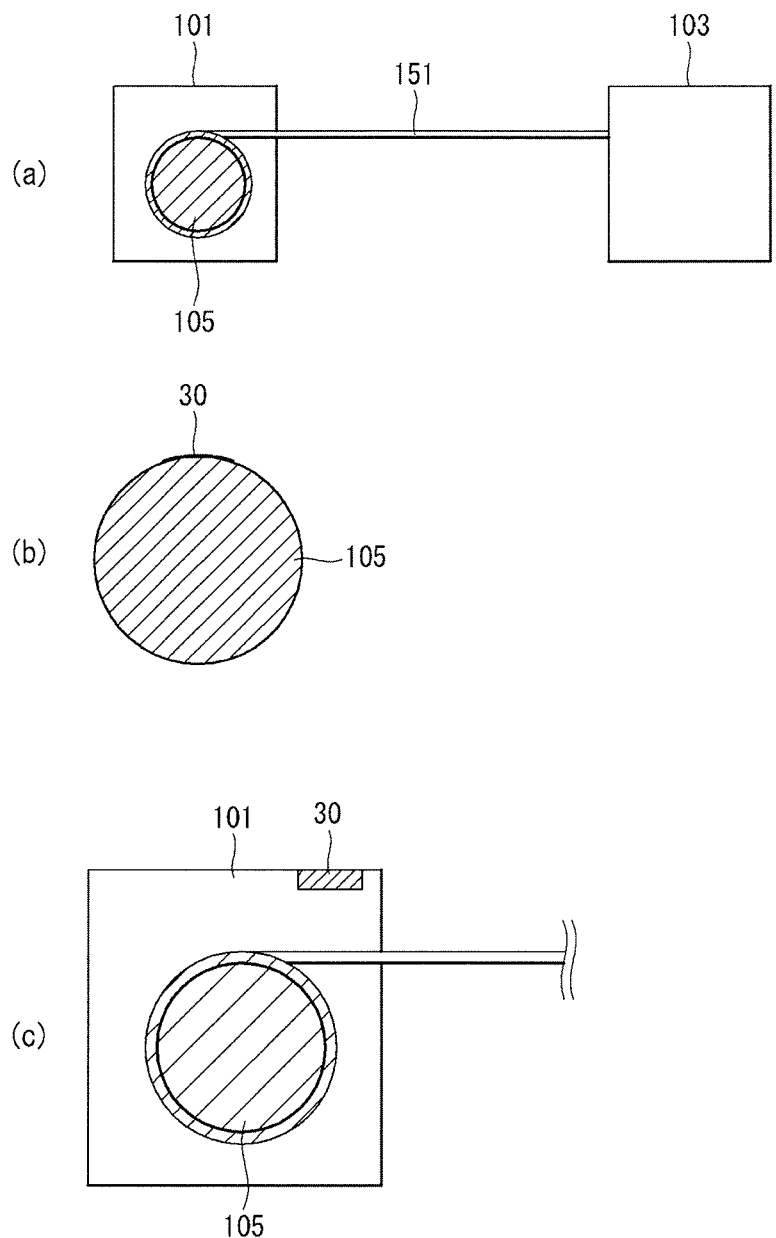
FIGS. 2A to 2D are diagrams for describing a method of sensing a rolling state or a rolling out state of a rollable display.

FIGS. 2A to 2D are diagrams for describing a method of sensing a rolling state or a rolling out state of the rollable display. FIG. 2A is a cross-sectional view of the mobile terminal including the rollable display.

Referring to (a) of FIG. 2A, the rollable display 151 can be rolled on a roll 105 inside of the first housing 101 and accommodated in the housing 101. The rollable display 151 is rolled on the roll 105 and the rolling state can be maintained with the front surface and the rear surface of the rollable display 151 facing each other.

Referring to (b) of FIG. 2A, the roll 105 may include a predetermined magnetic material 30 and the rollable display 151 may include a predetermined magnetic sensor which senses magnetic signals through the magnetic material 30 included in the roll 105. Referring to (c) of FIG. 2A, the magnetic material 30 may be provided on the upper surface of the first housing 101, the magnetic sensor included in the rollable display 151 may output a sensing signal when the rollable display rolled or rolled out, and the controller 180 can sense rolling or rolling out of the rollable display 151 through the sensing signal.

Figure 2B:
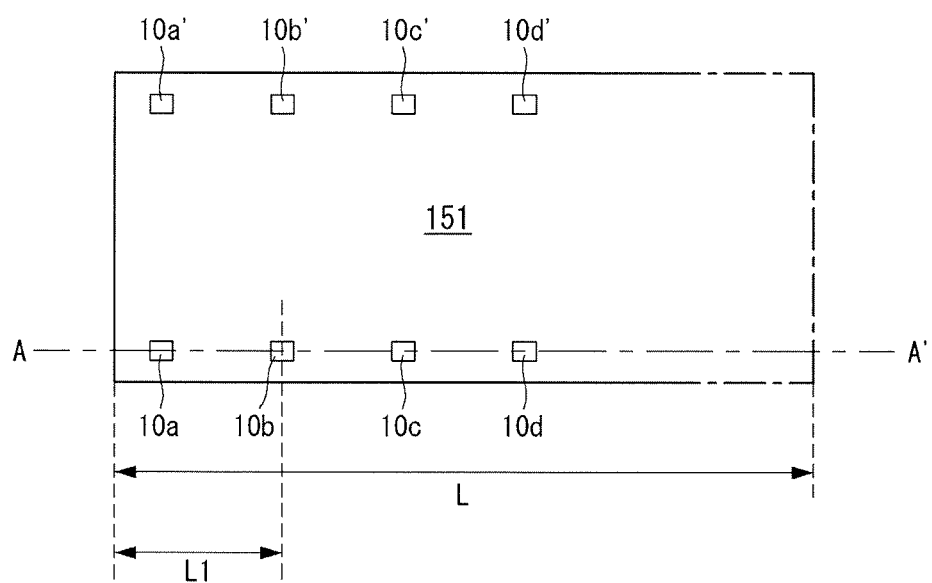
Figure 2C:
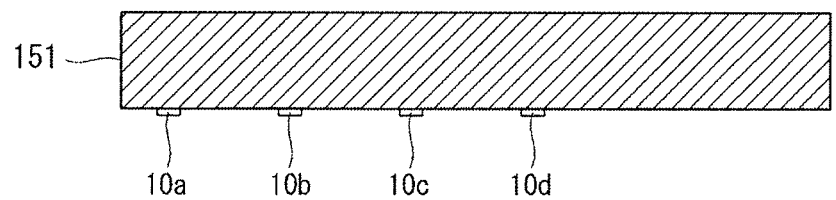

FIG. 2B is a plan view of a transparent display and FIG. 2C is a cross-sectional view taken along line A-A' of FIG. 2B in a state in which the transparent display is rolled out. Referring to FIGS. 2B and 2C, in the illustrated example, magnetic sensors 10a, 10b, 10c, 10d, . . . , 10a', 10b', 10c' and 10d' may be arranged at predetermined intervals L1 at both sides of the transparent display 151 in the horizontal direction. For clarity, the size of the magnetic sensors 10a, 10b, 10c, 10d, . . . , 10a', 10b', 10c' and 10d' is exaggerated. The magnetic sensors may be actually small and may be so small that they cannot be observed by the eyes as compared to the size of the rollable display shown in FIGS. 2B and 2C.

The magnetic sensors shown in FIGS. 2B and 2C may output magnetic signals according to the magnetic material included in the roll 105 in the first housing 101. The controller 180 can check a rolling state, a rolling out state, a rolling out degree (length) in the rolling out state, and the like according to the magnetic signals.

Figure 2D:
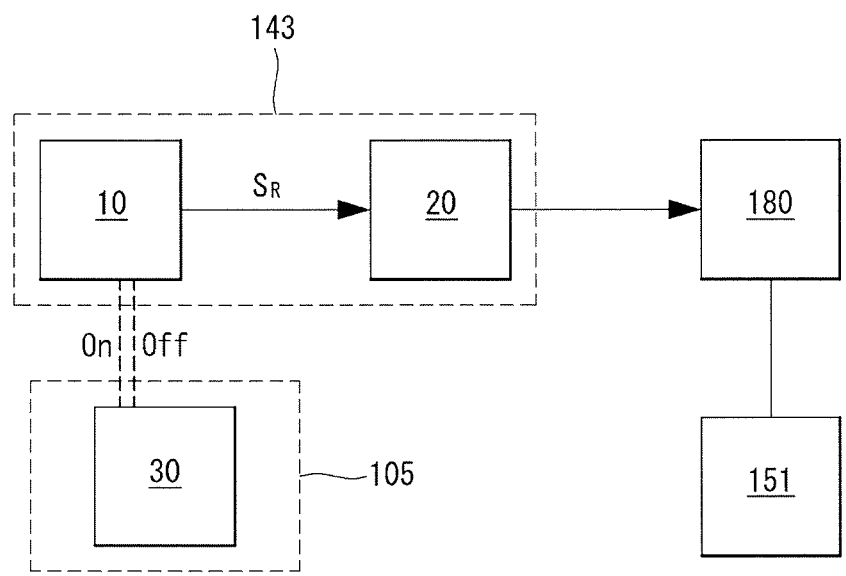

A method of sensing a rolling state of the rollable display 151 through a rolling sensing unit 143 of the mobile terminal 100 will be described in detail with reference to FIG. 2D. FIG. 2D is a diagram for describing a sensing operation of sensing a rolling state of the rollable display in the mobile terminal.

Referring to FIG. 2D, the mobile terminal 100 may further include the rolling sensing unit 143. The rolling sensing unit 143 may include a magnetic sensor 10 and a magnetic signal processor 20. The magnetic material 30 may be included in the first housing 101 (refer to FIG. 2A). A state in which the magnetic sensor 10 in the rollable display 151 senses the magnetic field of the magnetic material 30 of the roll 105 is defined as an "ON" state and a state in which the magnetic sensor 10 does not sense the magnetic field is defined as an "OFF" state.

The "ON" state may be a state in which the rollable display 151 starts to be rolled on the roll 105 and the "OFF" state may be a state in which the rollable display 151 is positioned outside the first housing. For example, when the rollable display 151 switches from an open state to a closed state, the magnetic sensor 10 senses the magnetic material 30 of the roll 105 and outputs a rolling signal SR.

The magnetic signal processor 20 can sense that the rollable display 151 is rolled into the first housing 101 and accommodated therein on the basis of the rolling signal SR. The magnetic signal processor 20 may calculate the rolling length, rolling out length and the like of the rollable display 151 as necessary. Since the mobile terminal 100 stores position information of the magnetic sensors 10a, 10b, 10c, 10d, . . . , 10a', 10b', 10c' and 10d' arranged in the rollable display 151, a rolling length or a rolling out length can be calculated to check the state of the rollable display 151 by detecting a sensing signal from a specific magnetic sensor.

Referring to FIG. 2B, on the assumption that the distance between the first magnetic sensor 10a and the second magnetic sensor 10b is L1, when the first magnetic sensor 10a and the second magnetic sensor 10b output sensing signals while the rollable display 151 is rolled into the first housing 101, the controller 180 can recognize that the rollable display has been rolled on the roll 105 by the length L1. When the overall length of the rollable display 151 is assumed to be L, a rolling length and a rolling out length can be sensed according to sensing signals of the magnetic sensors 10a, 10b, 10c, 10d, . . . , 10a', 10b', 10c' and 10d'.

Although a rolling state and a rolling out state of the rollable display 151 can be sensed through the aforementioned method according to an embodiment, the present invention is not limited thereto and can recognize rolling or rolling out of the rollable display 151 through various methods. The controller 180 can check a degree to which the rollable display 151 is rolled out according to a signal of the rolling sensing unit 143 and thus can control predetermined information to be displayed in the effective display area of the rollable display 151.

Although examples of sensing rolling and rolling out of the rollable display 151 using a predetermined magnetic sensor have been described above, the present invention is not limited thereto. For example, when the rollable display 151 includes a predetermined touch sensing panel and the touch sensing panel (not shown) is rolled in contact with a roll, a rolling degree, a rolling state and the like may be sensed by calculating a contact area.

Figure 3:
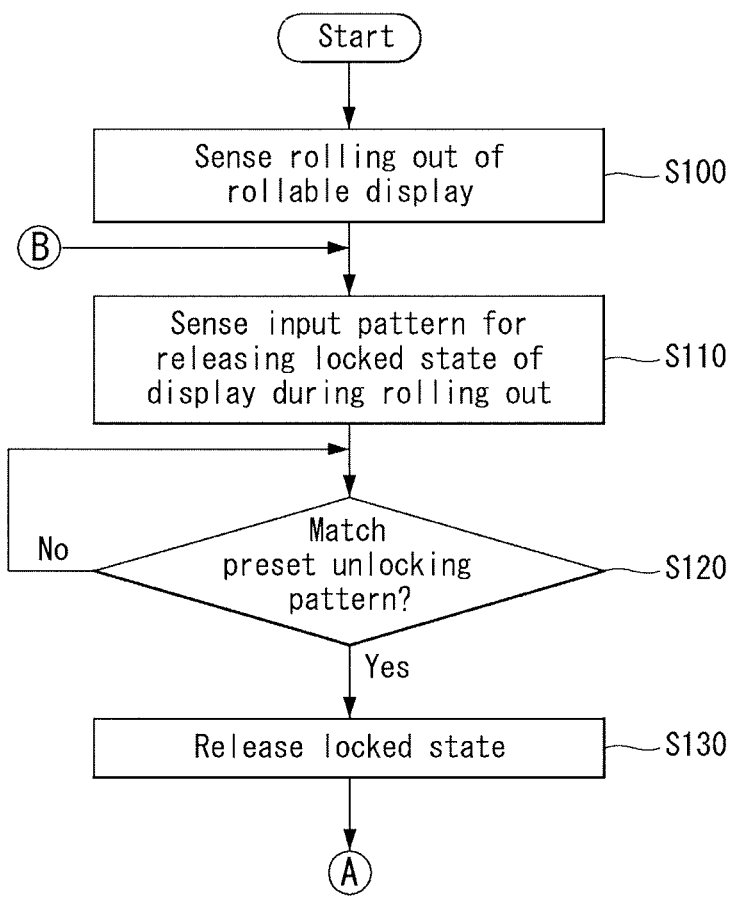
FIG. 3 is a flowchart of a control method of a mobile terminal for describing the concept of the present invention.
Figure 4:
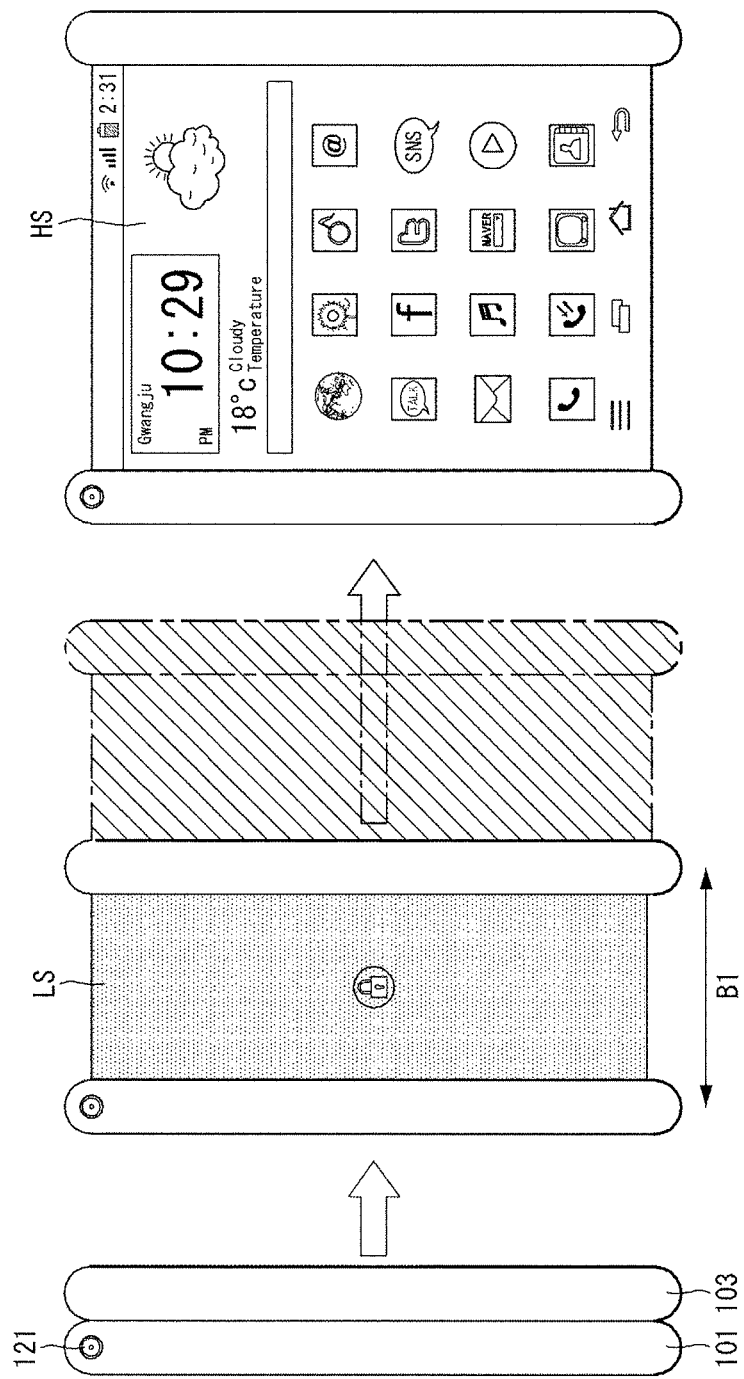
FIG. 4 is a diagram for describing the control method of a mobile terminal shown in FIG. 3.

FIG. 3 is a flowchart of a control method of a mobile terminal for describing the concept of the present invention. FIG. 4 is a diagram for describing the control method of a mobile terminal shown in FIG. 3. The control method of a mobile terminal may be implemented in the mobile terminal 100 described above with reference to FIGS. 1A to 2D.

Referring to FIG. 3, the controller 180 can sense rolling out of the rollable display 151 (S100). It is assumed that the display 151 used hereinafter is a rollable display. The controller 180 can sense an input pattern for releasing a closed state of the display during rolling out of the display 151 (S110).

When the display 151 starts to be rolled out, the controller 180 can provide power to the display 151 and provide a screen of a locked state (referred to as a lock screen hereinafter). The controller 180 can release the locked state of the display 151 when the input pattern matches a predetermined unlocking pattern (S130).

Referring to FIG. 4, the first housing 101 and the second housing 103 contact each other and thus are in a closed state. That is, the first housing 101 and the second housing 103 may maintain a contact state with the display 151 fully rolled up and accommodated in the first housing 101. Here, the display 151 is not exposed to the outside.

The display 151 can be rolled out as the second housing 103 is separated from the first housing 101. The controller 180 can provide a lock screen LS to the display 151 that is being rolled out. A lock screen having a preset size may be gradually exposed as the display 151 is rolled out or a lock screen may be provided in a size that varies as the size of the rolled out display 151 changes.

The controller 180 can receive a predetermined input pattern through the lock screen. The input pattern will be described in detail below with reference to FIG. 8. When the received input pattern matches a prestored unlocking pattern, the controller 180 can release the locked state of the display 151 and display a home screen HS or the like on the display 151. The home screen HS may be a screen including at least one application which is installed and can be used in the mobile terminal 100. The controller 180 can continuously provide the screen displayed on the display 151 immediately before the display 151 switches to the locked state in addition to the home screen.

According to an embodiment of the present invention, screen composition displayed on the display 151 may be provided in stages depending on a degree to which the display 151 is rolled out. Although FIG. 4 shows an example in which the lock screen is provided when the display 151 is rolled out and the home screen is provided upon release of the locked state, the present invention is not limited thereto.

Figure 5:
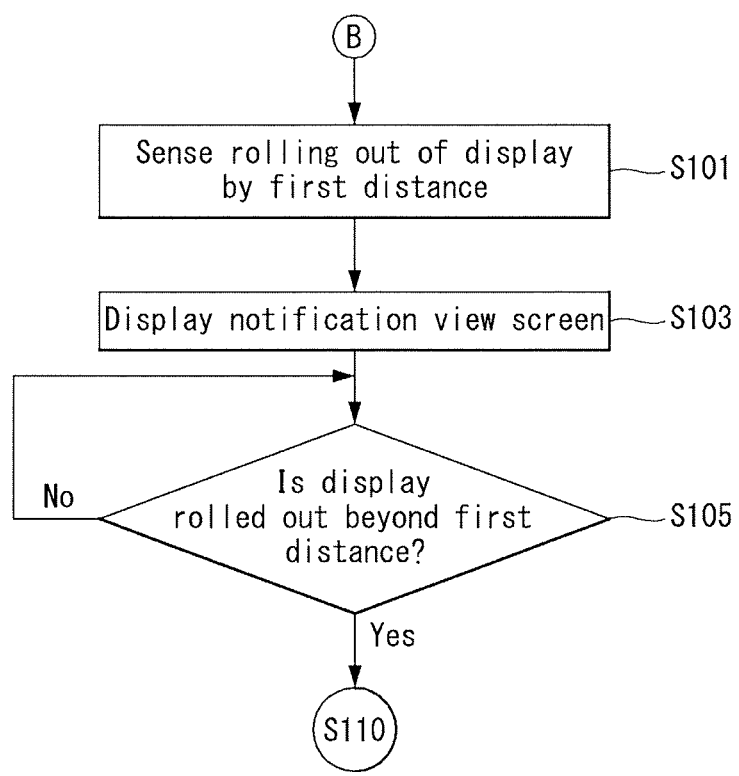
FIG. 5 is a flowchart of a control method of a mobile terminal according to a first embodiment of the present invention.
Figure 6:
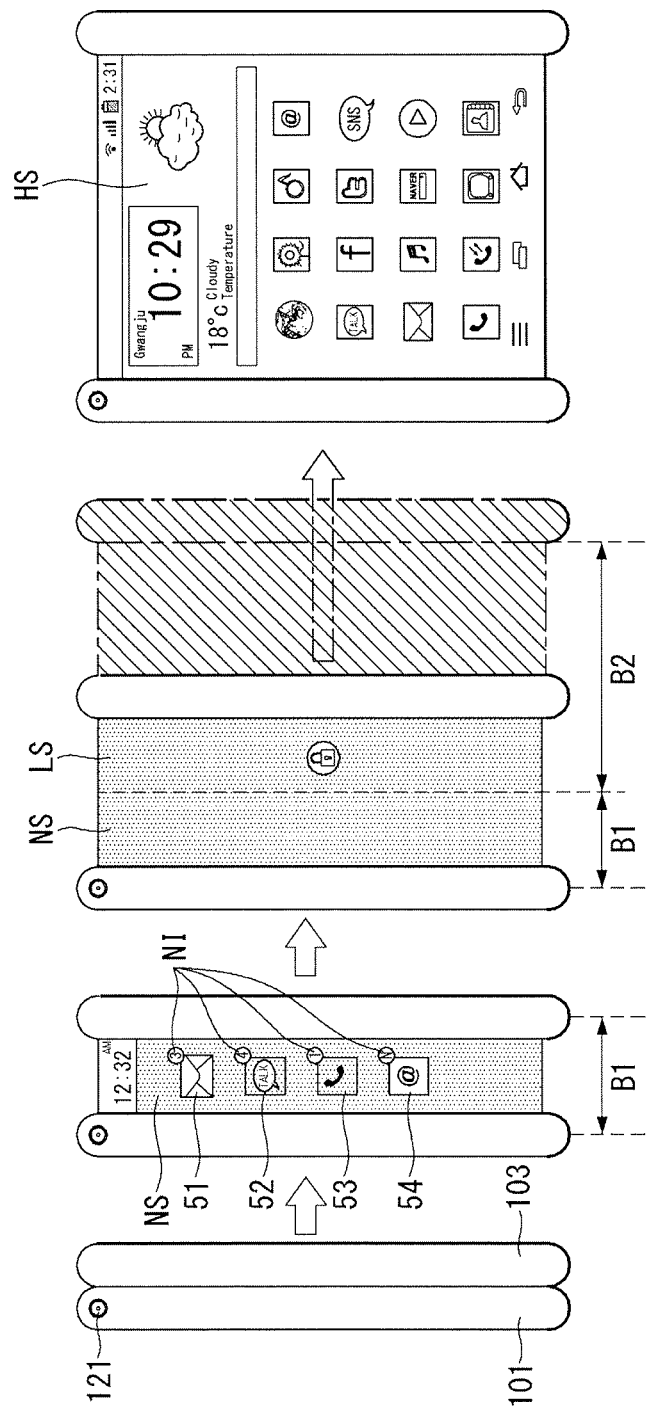
FIGS. 6 and 7 are diagrams for describing examples in which the control method of a mobile terminal according to the first embodiment of the present invention is implemented.
Figure 7:
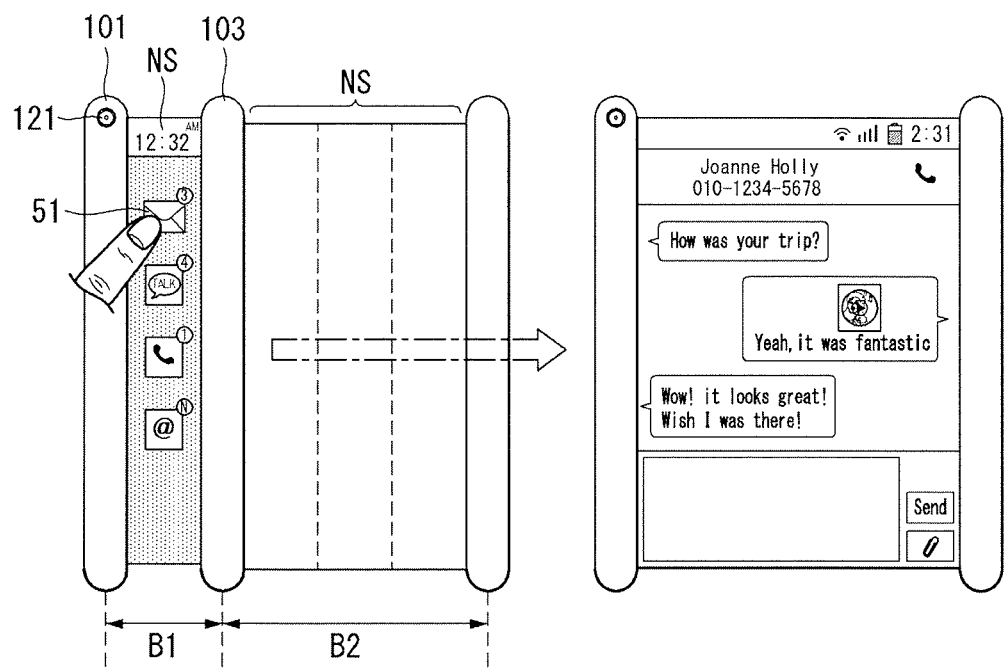

FIG. 5 is a flowchart of a control method of a mobile terminal according to a first embodiment of the present invention. FIGS. 6 and 7 are diagrams for describing examples in which the control method of a mobile terminal according to the first embodiment of the present invention is implemented.

The control method of a mobile terminal according to the first embodiment of the present invention may be implemented in the mobile terminal 100 described above with reference to FIGS. 1A to 2D. The control method of a mobile terminal according to the first embodiment of the present invention and operations of the mobile terminal 100 to implement the control method will be described in detail below with reference to the drawings.

Referring to FIG. 5, the controller 180 can sense rolling out of the display 151 in a closed state of the mobile terminal 100 (which corresponds to S100 of FIG. 3) and sense that the display 151 has been rolled out by a first distance B1 (S101). The first distance may correspond to the distance between the first housing 101 and the second housing 103. The degree of rolling out of the display 151 from the first housing can be calculated through the rolling sensing unit 143 described above with reference to FIGS. 2A to 2D.

When the display 151 is rolled out by the first distance B1, the controller 180 can display a screen NS providing an alarm view on the rolled-out display 151. The alarm view may include at least one icon which corresponds to at least one application 51, 52, 53 and 54 which is installed and can be used in the mobile terminal 100. When predetermined notification information (NI) is present for the at least one application, the alarm view may be a screen in which the notification information is associated with each icon.

The notification information may include update information and version-up information of an application, information related to content provided to a user, etc. In addition, the notification information may include the number of unidentified contents, and the unidentified contents may include unidentified received messages, unidentified missed calls, unidentified received mail, etc.

The controller 180 can provide a lock screen LS to the display 151 upon sensing that the display 151 is additionally rolled out beyond the first distance B1. Then, the controller 180 can release a locked state and provide a home screen HS to the display 151 when an unlocking pattern is input through the lock screen LS.

Referring to FIG. 7, the controller 180 can sense additional rolling out of the display 151 by a second distance B2 exceeding the first distance B1 in a state in which a specific icon 51 has been selected from at least one icon displayed on the alarm view screen NS shown in FIG. 6. The specific icon 51 may be selected by a user's hand gripping the first housing 101.

The controller 180 can release the locked state and simultaneously display a screen for executing a function corresponding to the specific icon 51 on the display 151 when a prestored unlocking pattern is input through the lock screen while the display 151 is rolled out. The screen displayed on the display 151 simultaneously with release of the locked state may be a screen providing notification information included in the specific icon 51 instead of a normal execution screen of the specific icon 51. For example, when the specific icon 51 corresponds to a text message application and the notification information represents the number of unidentified received messages, the controller 180 can release the locked state and simultaneously provide a screen displaying received messages to the display 151.

An example in which the mobile terminal in a closed state differentiates screen composition provided to the display in stages depending on a degree of rolling out of the display 151 has been described above. For example, different screen compositions can be provided over three stages while the mobile terminal 100 switches from a closed state to an open state through an intermediate state.

A method of releasing a locked state through a lock screen when the display 151 is rolled out will be described below. FIGS. 8A to 11 are diagrams for describing examples in which a control method of a mobile terminal according to a second embodiment of the present invention is implemented.

The control method of a mobile terminal according to the second embodiment of the present invention may be implemented in the mobile terminal 100 described above with reference to FIGS. 1A to 2D. The control method of a mobile terminal according to the second embodiment of the present invention and operations of the mobile terminal 100 to implement the control method will be described in detail below with reference to the drawings. The second embodiment of the present invention may be based on the first embodiment.

FIGS. 8A to 8D are diagrams for describing an example in which an unlocking pattern is input during rolling out of the display 151 according to the second embodiment of the present invention. The display 151 may provide a plurality of virtual regions in a row on a lock screen. The controller 180 can receive a plurality of touch inputs sequentially applied to at least one of the virtual regions in a predetermined order whenever the display 151 is rolled out in the process of discontinuously rolling out the display 151 by a predetermined number of times. When an input pattern formed by the plurality of touch inputs matches a preset unlocking pattern, the controller 180 can release the locked state.

Figure 8A:
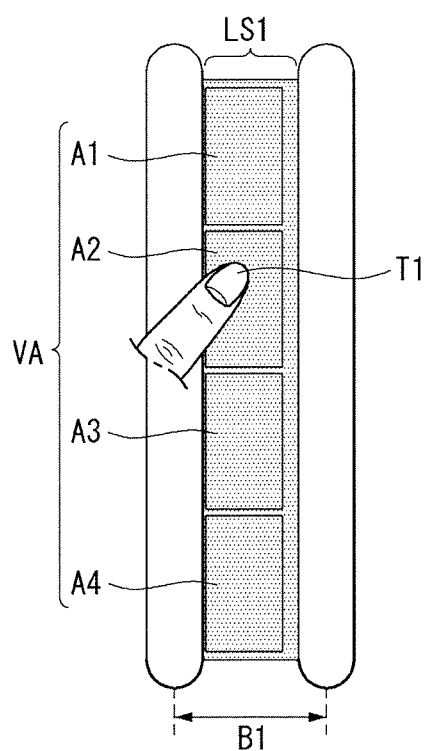
FIGS. 8A to 11 are diagrams for describing examples in which a control method of a mobile terminal according to a second embodiment of the present invention is implemented.

Referring to FIG. 8A, the controller 180 can provide a first lock screen LS to the display 151 upon sensing rolling out of the display 151 in a closed state by the first distance B1. The first lock screen LS may be a part corresponding to the first distance in the entire screen. The controller 180 can arrange virtual areas VA which divide the display 151 into a plurality of regions in a row separately from the first lock screen LS.

That is, a first virtual area VA1, a second virtual area VA2, a third virtual area VA3 and a fourth virtual area VA4 may be arranged and displayed in the vertical direction. The display 151 corresponding to the first distance B1 may be a narrow area in which only the virtual areas VA are displayed. The number of virtual areas may be predefined by the user when an unlocking pattern is set.

In a state in which the display 151 has been rolled out by the first distance B1, the controller 180 can receive a first touch input T1 of selecting the second virtual area VA2 from among the plurality of virtual areas VA. The controller 180 can sense that the display 151 is rolled out by a second distance B2 as the second housing 103 is moved to the right after reception of the first touch input T1.

Figure 8B:
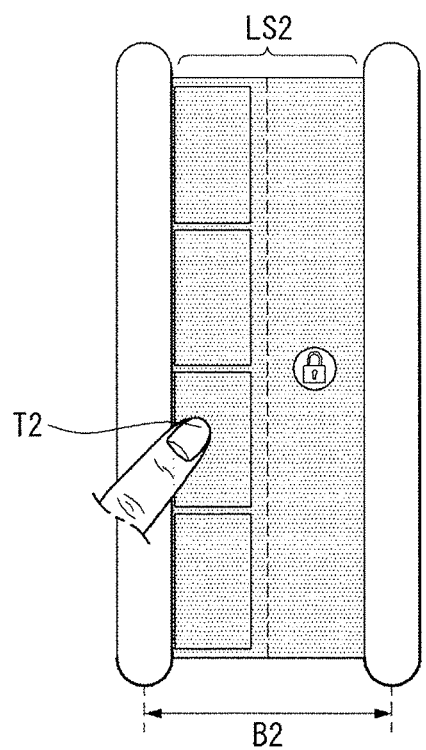

Referring to FIG. 8B, when the display 151 is has been rolled out by the second distance B2, the controller 180 can display a second lock screen LS2 on the display 151. The first lock screen LS1 shown in FIG. 8A and the second lock screen LS2 shown in FIG. 8B are not different screens, and the lock screen LS is simply classified as the first lock screen LS1 and the second lock screen LS2 because the area of the display 151 exposed to the outside increases as the display 151 is rolled out and thus different views are provided to the user.

The display 151 rolled out by the second distance B2 can additionally show a part of the screen in a locked state in addition to the virtual areas VA. The controller 180 can receive a second touch input T2 applied to the third virtual area VA3 through the displayed rolled out by the second distance B2. The controller 180 can sense that the display 151 is rolled out by a third distance B3 as the second housing 103 is further moved to the right after reception of the second touch input T2.

Figure 8C:
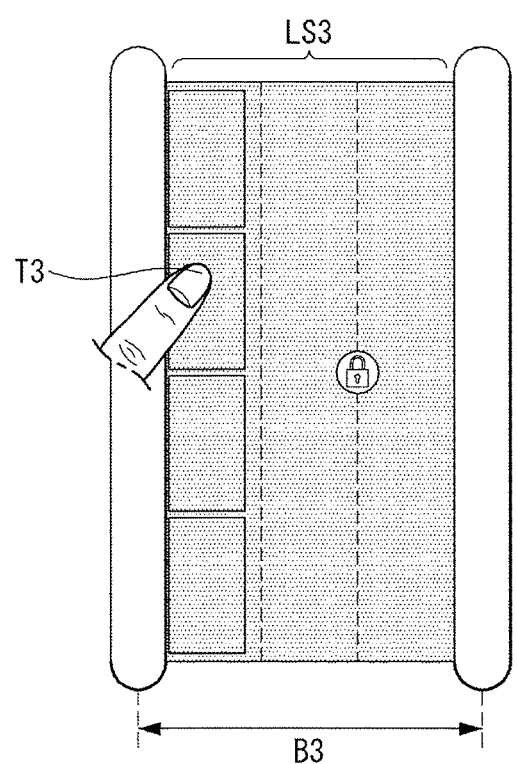

Referring to FIG. 8C, the controller 180 can display a third lock screen LS3 on the display 151 when the display 151 has been rolled out by the third distance B3. The controller 180 can receive a third touch input T3 applied to the second virtual area VA2 in the state of the third lock screen LS3.

Figure 8D:
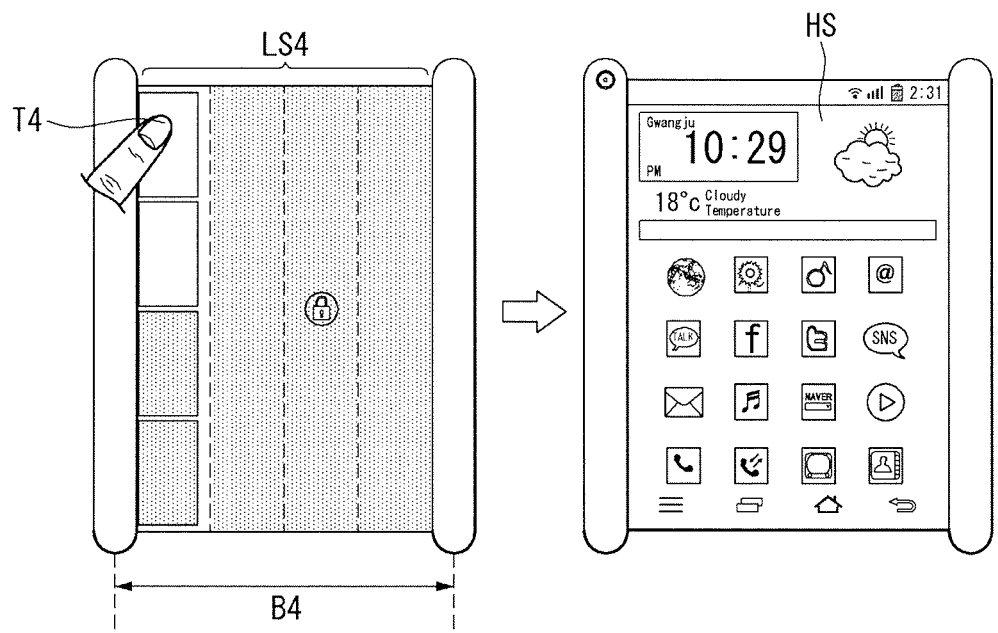

Referring to FIG. 8D, the controller 180 can display a fourth lock screen LS4 on the display 151 when the display 151 is rolled out by a fourth distance B4. The controller 180 can receive a fourth touch input T4 applied to the first virtual area VA1 in the state of the fourth lock screen LS4.

An input pattern applied to the display 151 as the display 151 is rolled out is formed of touch inputs sequentially applied to the second virtual area→third virtual area→second virtual area→first virtual area, as shown in FIGS. 8A to 8D, in the process of discontinuously rolling out the display 151 four times. The controller 180 can release the locked state and display a home screen on the display 151, as shown in FIG. 8D, when the input pattern matches a prestored unlocking pattern.

Such an unlocking pattern input when the rollable display 151 is rolled out may be called rollable code, and the rollable code refers to an unlocking pattern which is input as described above.

Figure 9:
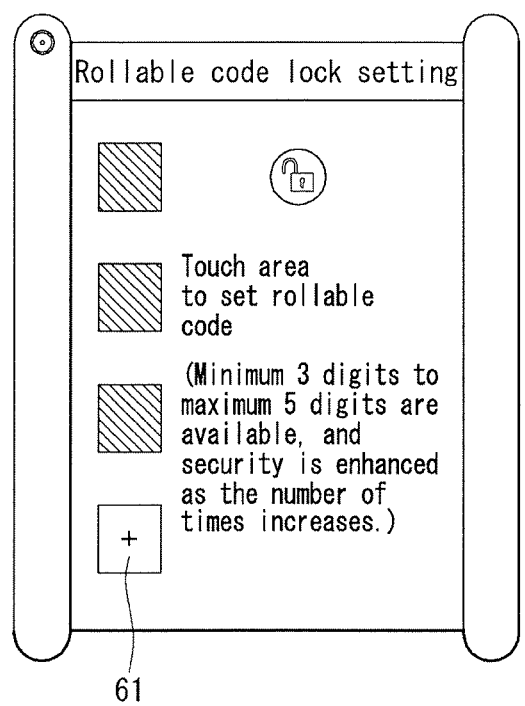
Figure 10:
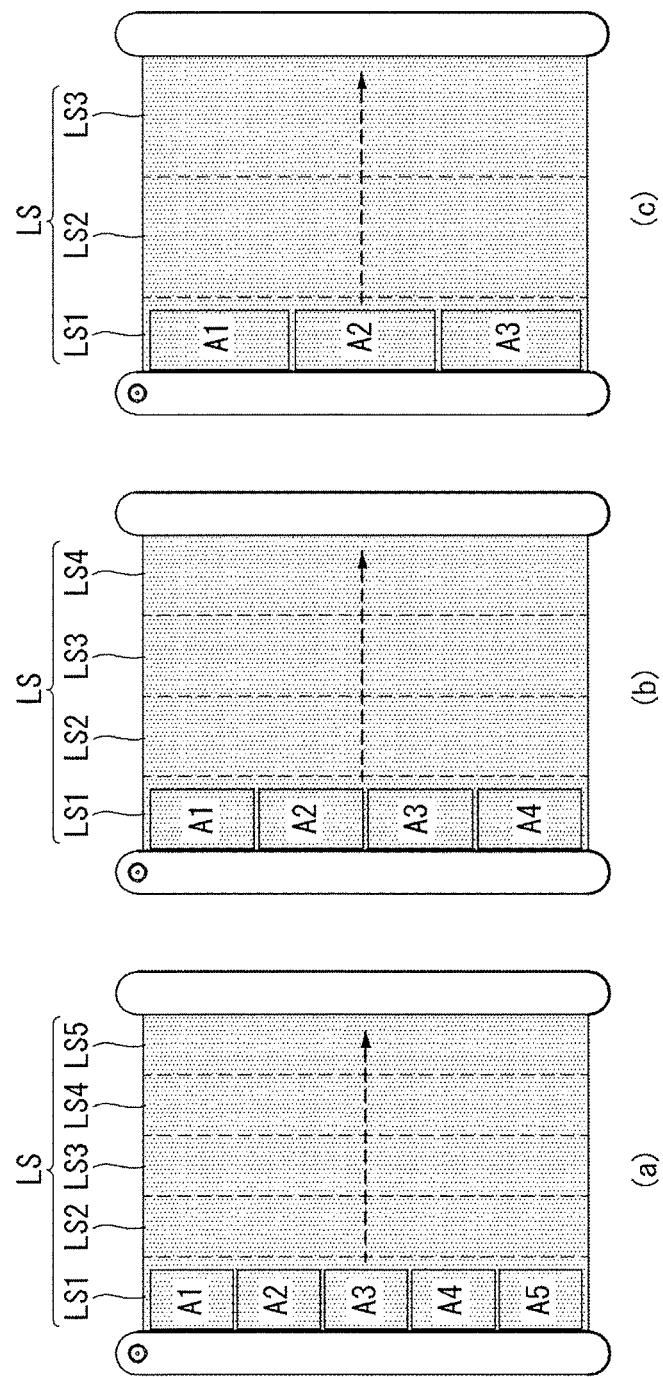

FIGS. 9 and 10 are diagrams for describing a method of setting a rollable code as an unlocking pattern according to the first embodiment of the present invention. Referring to FIG. 9, a rollable code setting screen may provide a graphical object 61 by which the number of touchable virtual areas can be set. FIG. 9 shows that the number of virtual areas is set to 3, and a virtual area may be added through the graphical object 61. That is, the number of rollable codes can be adjusted. That is, the number of rollable codes is the same as the number of virtual areas and also corresponds to the number of times the display 151 is discontinuously rolled out.

FIG. 10 illustrates an example of setting various rollable codes according to the first embodiment of the present invention. Referring to FIG. 10(a), 5 rollable codes are set, and the user can select virtual areas A1, A2, A3, A4 and A5 corresponding to respective distances when the display 151 is discontinuously rolled out five times. For example, the user can select the third virtual area A3 when the display 151 has been rolled out by the first distance, the user can select the second virtual area A2 when the display 151 has been rolled out by the second distance, the user can select the fifth virtual area A5 when the display 151 has been rolled out by the third distance, the user can select the fourth virtual area A4 when the display 151 has been rolled out by the fourth distance, and the user can select the first virtual area A1 when the display 151 has been rolled out by the fifth distance in FIG. 10(a). Accordingly, the inputs which are sequentially applied to the third virtual area→second virtual area→fifth virtual area→fourth virtual area→first virtual area when the display 151 is discontinuously rolled out five times can be set as an unlocking pattern.

FIGS. 10(b) and (c) respectively illustrate cases in which the number of rollable codes is 4 and 3, and a method of setting an unlocking pattern is the same as the above-described method. The rollable code may be appropriately selected in consideration of security and usability. For example, when security is regarded as important, the number of rollable codes can be increased. The rollable code may be input by the left thumb of a user who grips the first housing 101.

Accordingly, the number of virtual areas increases as the number of rollable codes increases, and thus a user who has a big left thumb highly likely inputs a wrong rollable code because the distance between virtual areas is reduced. In such a case, the number of rollable codes may be reduced. When fast unlocking is required, the number of rollable codes may also be decreased.

Figure 11:
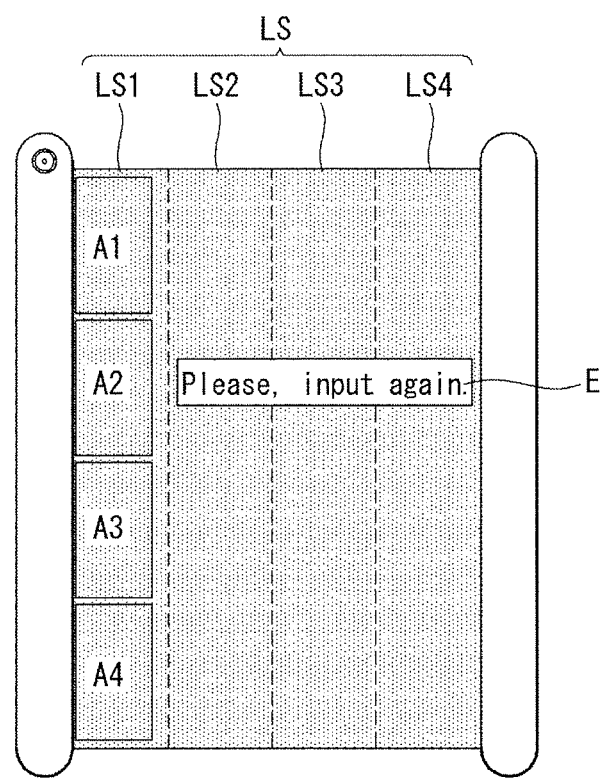

Referring to FIG. 11, when a wrong rollable code is input, the controller 180 can display an error message E on the display 151. In this case, the error message may be provided on the display 151 on which a lock screen is displayed in a locked state. Further, when the user wants to re-input the unlocking pattern upon confirmation of the error message, the user can return the rolled-out display to the closed state.

The length of the display discontinuously rolled out depending on the number of rollable codes may correspond to the overall length of the display or part of the overall length of the display. Accordingly, the unlocking pattern may be input by repeating the process of rolling out the display 151 at corresponding points of time without returning the display 151 to the closed state after confirmation of the error message. That is, the unlocking process can be performed through the aforementioned method when the overall length of the display is long.

A case in which a locked state is released using a rollable code when the display in a closed state is rolled out in one direction has been described in the second embodiment of the present invention. However, the present invention is not limited thereto. For example, a first direction in which the display is rolled out, a second direction in which the display is rolled up, a distance in which the display is rolled out in the first direction, a distance in which the display is rolled up in the second direction, etc. may be combined and used as an unlocking pattern.

Figure 12A:
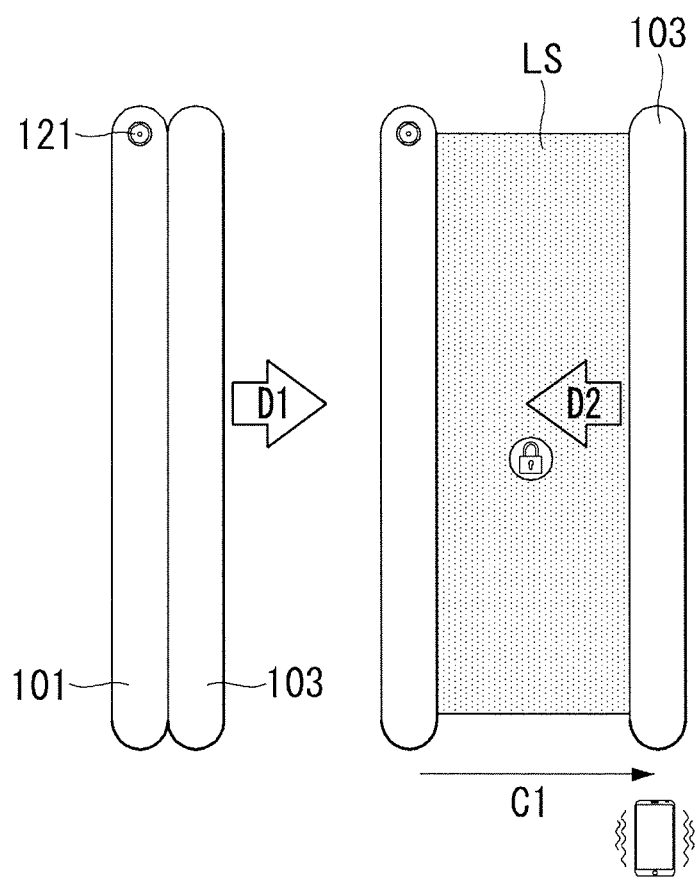
FIGS. 12A and 12B are diagrams for describing examples in which a control method of a mobile terminal according to a third embodiment of the present invention is implemented.
Figure 12B:
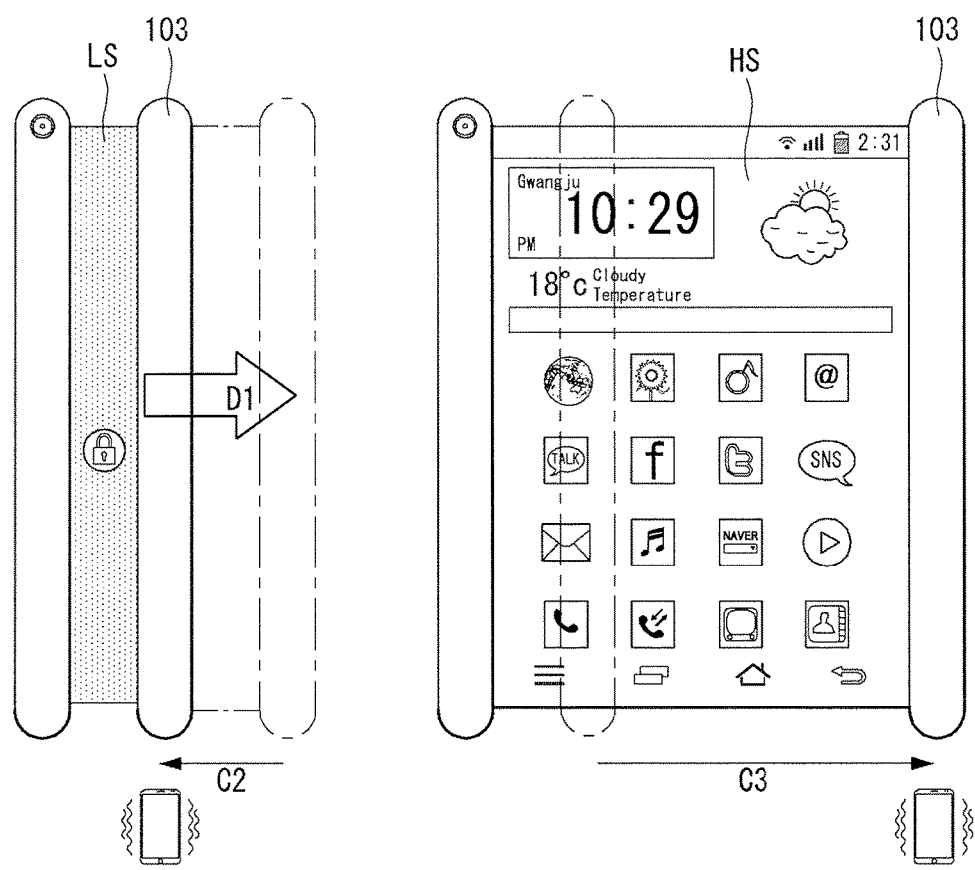
Figure 12C:
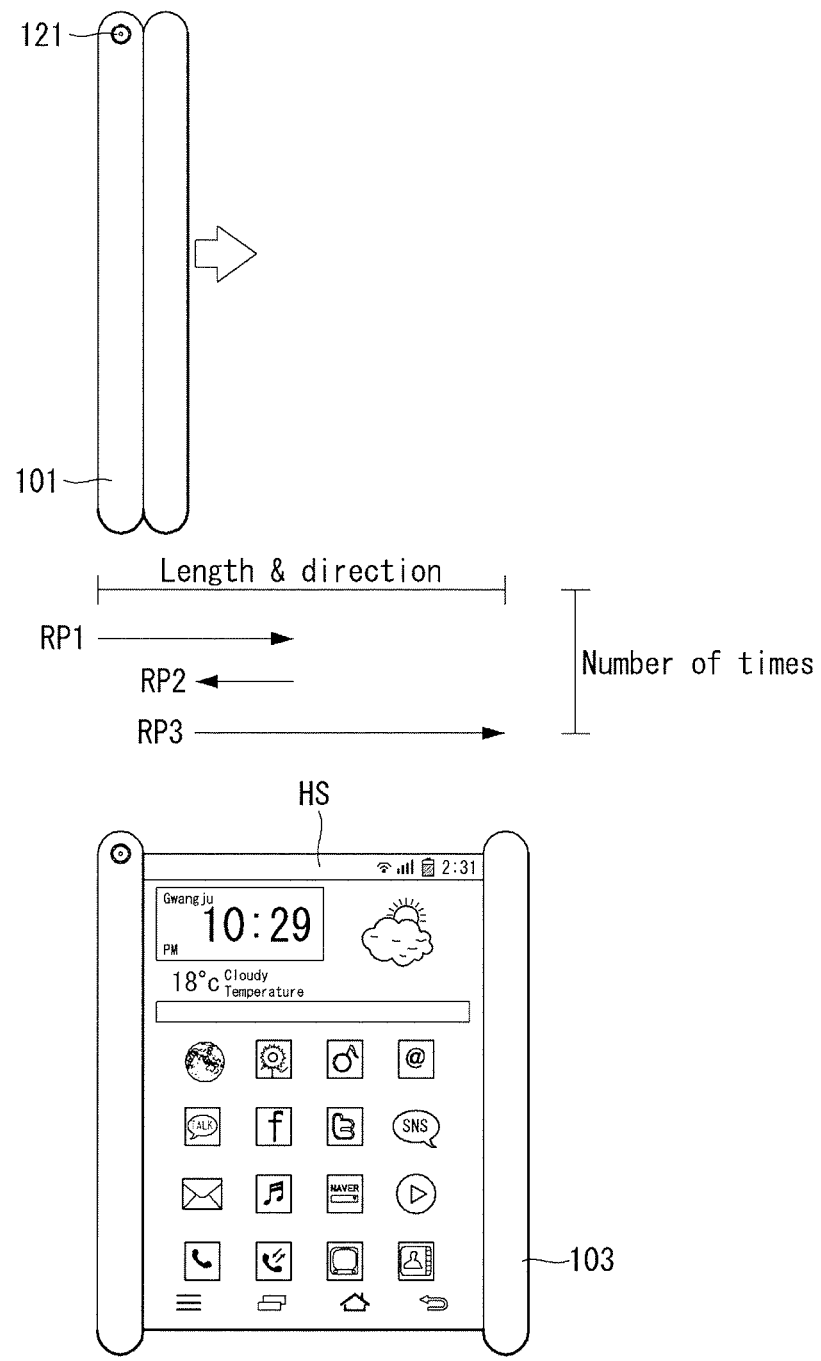

FIGS. 12A to 12C are diagrams for describing examples in which a control method of a mobile terminal according to a third embodiment of the present invention is implemented. The control method of a mobile terminal according to the third embodiment of the present invention may be implemented in the mobile terminal 100 described above with reference to FIGS. 1A to 2D. The control method of a mobile terminal according to the third embodiment of the present invention and operations of the mobile terminal 100 to implement the control method will be described in detail below with reference to the drawings. The third embodiment of the present invention may be based on the first embodiment and/or the second embodiment.

An unlocking pattern set in the mobile terminal 100 according to the third embodiment may include a plurality of rolling patterns during discontinuous rolling of the display 151, and the plurality of rolling patterns may include a pattern defined by a combination of a rolling distance, a rolling direction and the number of times of rolling.

Referring to FIG. 12A, it is assumed that a rolling pattern in which the second housing 103 is moved by a first distance C1 in a first direction D1 in a closed state of the display 151 is a first rolling pattern. The mobile terminal 100 senses the first rolling pattern and then may additionally sense a second rolling pattern.

Referring to FIGS. 12A and 12B, a second rolling pattern may be defined as a pattern in which the second housing 103 is moved by a second distance C2 in a second direction D2 opposite to the first direction D1 from the position thereof defined by the first rolling pattern. The mobile terminal 100 senses the second rolling pattern and then may additionally sense a third rolling pattern.

The third rolling pattern may be defined as a pattern in which the second housing 103 is moved by a third distance C3 in the first direction D1 from the position thereof defined by the second rolling pattern and thus the display 151 is rolled out by the third distance C3. That is, referring to FIGS. 12A and 12B, an unlocking pattern predetermined by the user may be defined as an input pattern in which the first, second and third rolling patterns are sequentially sensed.

Referring to FIG. 12C, in the control method of a mobile terminal according to the third embodiment of the present invention, three rolling patterns are input, the first rolling pattern is rolling out of the display 151 by the first distance, the second rolling pattern is rolling up of the display 151 by the second distance, and the third rolling pattern is rolling out of the display 151 by the third distance. A locked state can be released when the input pattern formed by a combination of the three rolling patterns is input.

The controller 180 can notify the user whether each rolling pattern has been correctly input through a predetermined feedback signal. For example, the controller 180 can output a predetermined feedback signal whenever each rolling pattern is sensed when each rolling pattern matches the unlocking pattern. The feedback signal may include at least one of a vibration signal, a sound signal and an optical signal.

For example, referring to FIGS. 12A and 12B, the controller 180 can output a first feedback signal through a haptic module upon sensing the first rolling pattern. In addition, the controller 180 can output a second feedback signal through an audio output unit upon sensing the second rolling pattern. Further, the controller 180 can output a third feedback signal through an optical output unit upon sensing the third rolling pattern. The above description is exemplary and not restrictive and thus all of the first to third feedback signals may be vibration signals.

Figure 13A:
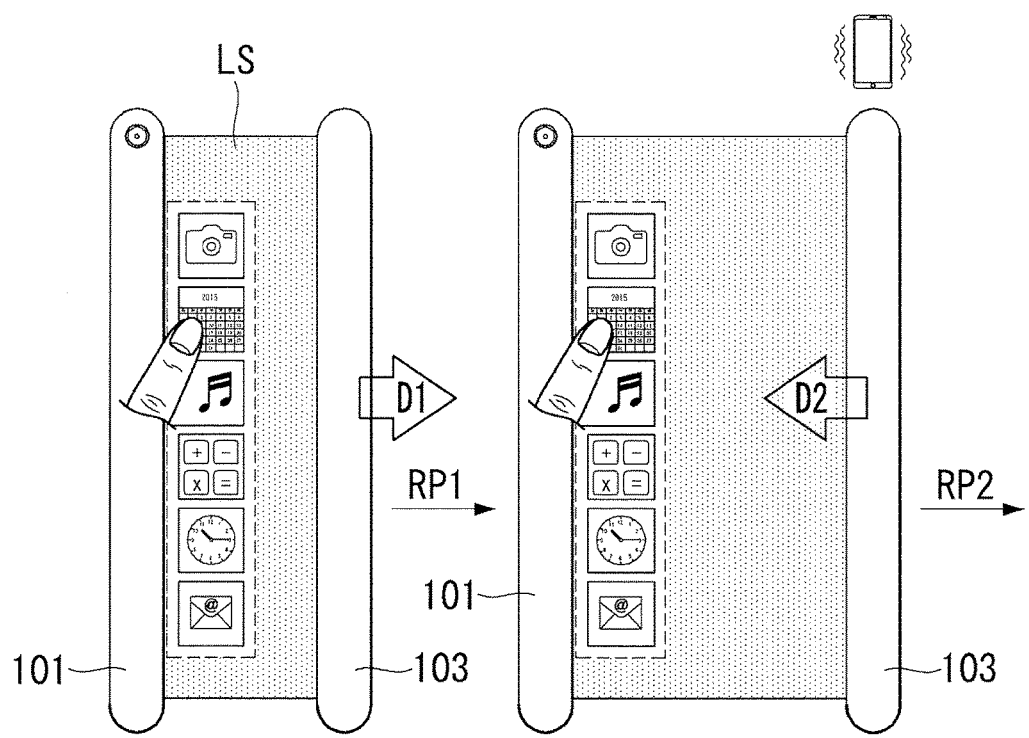
FIGS. 13A and 13B are diagrams for describing another example in which the control method of a mobile terminal according to the third embodiment of the present invention is implemented.
Figure 13B:
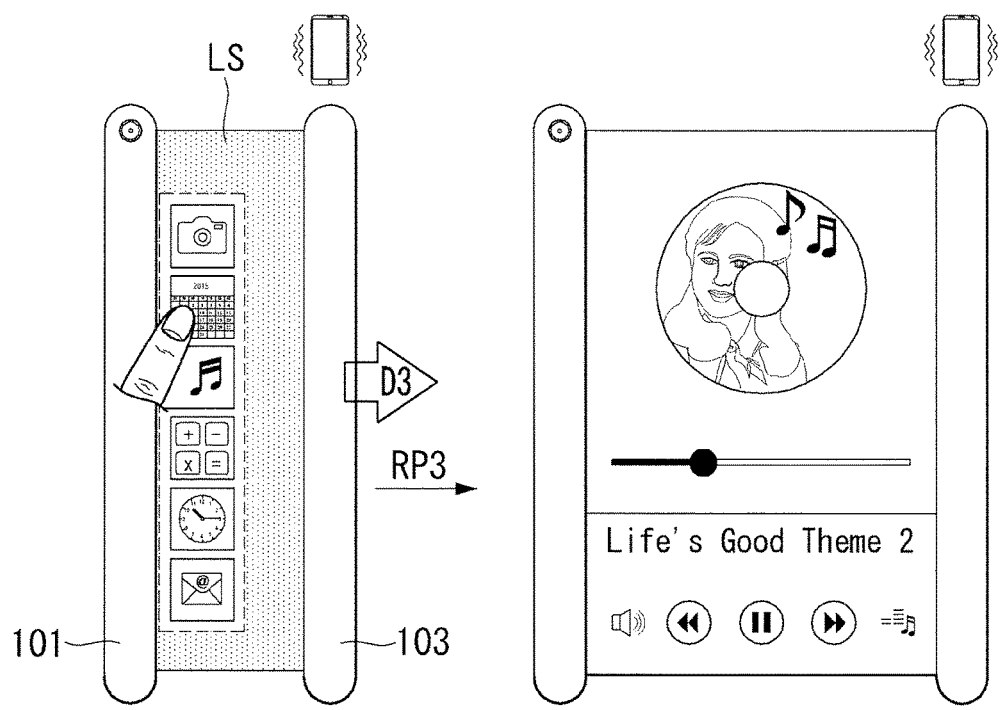

FIGS. 13A and 13B are diagrams for describing another example in which the control method of a mobile terminal according to the third embodiment of the present invention is implemented. Referring to FIG. 13A, when a locked state is released upon input of the plurality of rolling patterns described in FIGS. 12A and 12B, a screen that the user desires may be directly displayed simultaneously with release of the locked state.

The controller 180 can display an application tray on the display 151 upon reception of the first rolling pattern, as described above with reference to FIGS. 12A and 12B. The application tray may include at least one application icon which can be used in the mobile terminal. The controller 180 can display the application tray on the display 151 upon input of the first rolling pattern or immediately display the application tray when the display 151 starts to be rolled out even if the first rolling pattern is not completed.

For example, referring to FIGS. 13A and 13B, a specific application icon (e.g., a multimedia icon) may be selected in a state in which the application tray is displayed. When the first, second and third rolling patterns, described above with reference to FIGS. 12A and 12B, are sequentially input upon selection of the multimedia icon, the controller 180 can release the locked state and simultaneously display an execution screen corresponding to the multimedia icon on the display 151.

Figure 14:
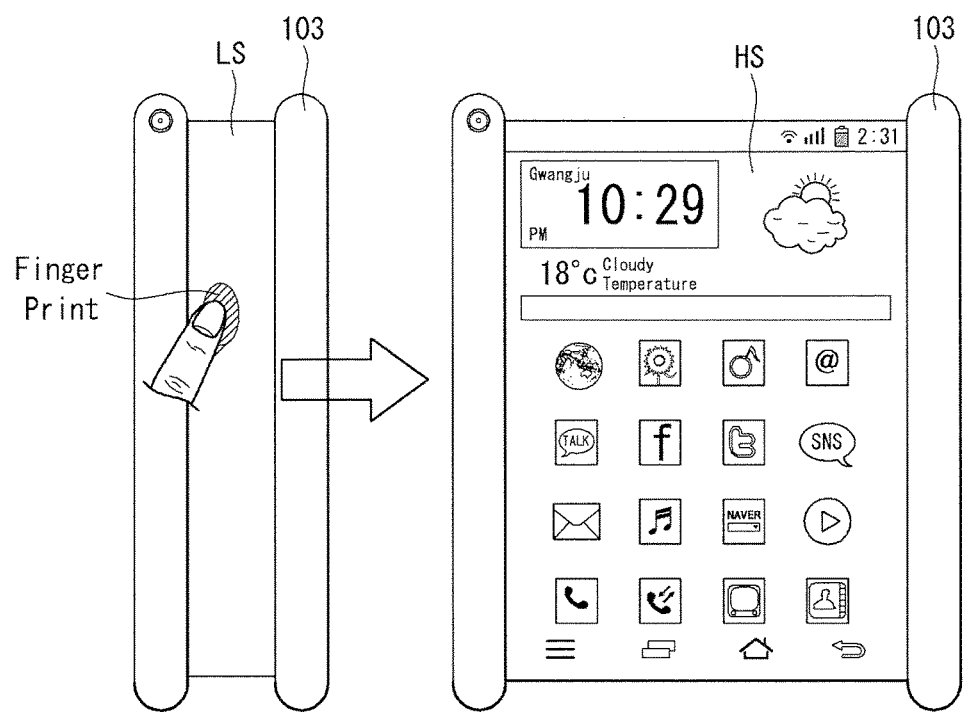
FIG. 14 is a diagram for describing an example in which a control method of a mobile terminal according to a fourth embodiment of the present invention is implemented.

FIG. 14 is a diagram for describing an example in which a control method of a mobile terminal according to a fourth embodiment of the present invention is implemented. Referring to FIG. 14, the mobile terminal 100 according to an embodiment of the present invention may include a fingerprint recognition module. The fingerprint recognition module can recognize a fingerprint of a user which is input to any region of the display 151 including a touchscreen. The controller 180 can execute a fingerprint recognition function when the fingerprint of the user is input to at least one region of the display 151 in a state in which the display 151 has been rolled out by a predetermined distance, and when the fingerprint is determined to match a prestored fingerprint pattern of the user, can provide an unlocked screen on the display 151 upon rolling out of the display 151 without input of the unlocking pattern described in the above-described embodiments.

That is, the unlocking process disclosed through the above-described embodiments can be compressed into input of the fingerprint of the user. Further, the fourth embodiment of the present invention may be combined with at least one of the above-described first, second and third embodiments to execute various functions with enhanced security.

Figure 15B:
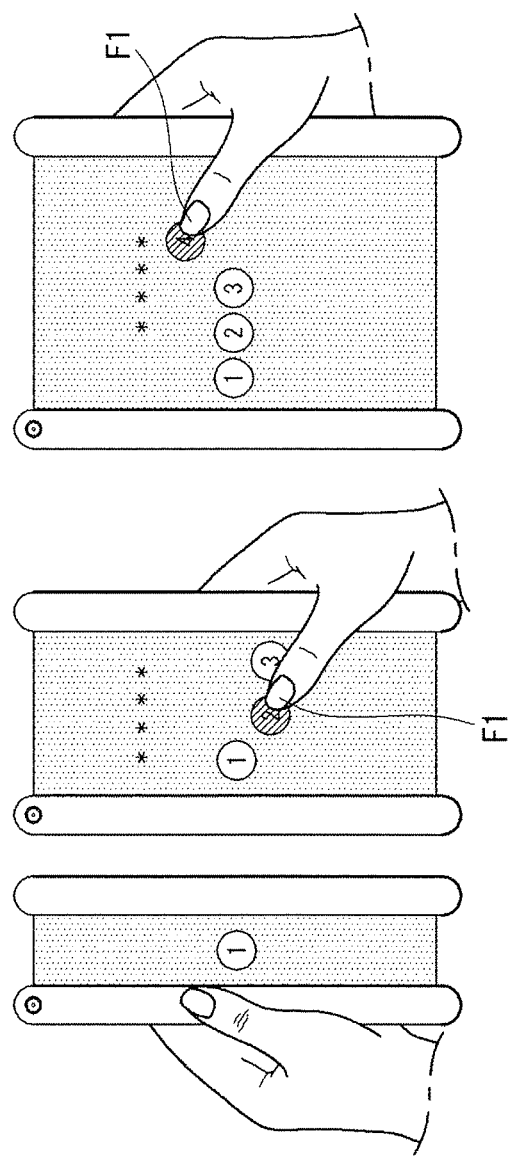

FIGS. 15A and 15B are diagrams for describing an example in which a control method of a mobile terminal according to a fifth embodiment of the present invention is implemented. According to the fifth embodiment of the present invention, elements of a lock screen (e.g., numerals in FIG. 15A) may be sequentially exposed on the display 151 when the display 151 is rolled out. Referring to FIG. 15A, the controller 180 can receive touch inputs of sequentially selecting one or more elements of the lock screen, which are displayed when the display 151 is rolled out. When the received touch inputs match a preset unlocking pattern, the controller 180 can release the locked state.

Referring to FIG. 15B, the mobile terminal 100 according to an embodiment of the present invention may further include a grip sensor capable of sensing the position of a user's hand gripping the first housing and the second housing. Accordingly, the controller 180 can confirm the position of the user's hand gripping the mobile terminal through the grip sensor during rolling out of the display 151 and display the elements of the lock screen while varying the positions of the elements in real time depending on the position of the user's hand.

Figure 15C:
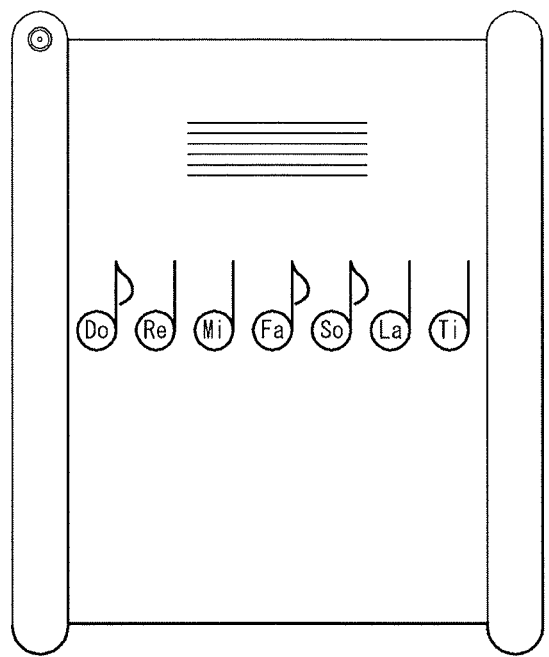
Figure 15D:
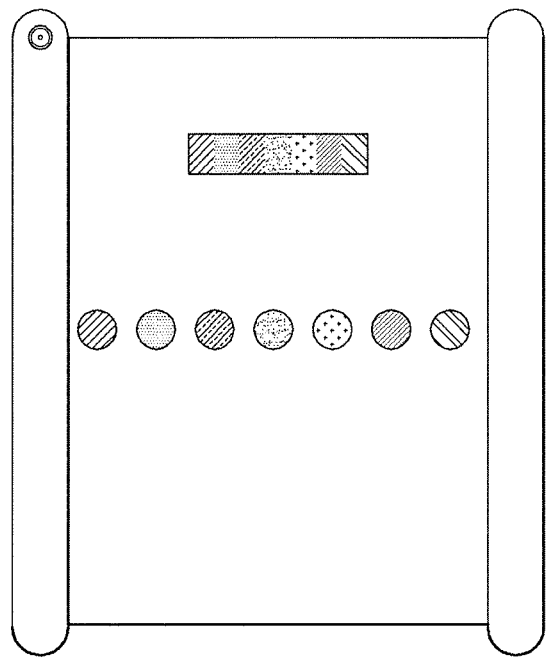

Referring to FIG. 15C, the controller 180 can sequentially display the elements of the lock screen on the display 151 when the display 151 is rolled out and simultaneously output sound effects corresponding to each element through the audio output unit. Referring to FIG. 15D, the controller 180 can change display properties of the elements of the lock screen when the elements are sequentially displayed on the display 151 while the display 151 is rolled out. For example, the display properties are colors, and animation effects may be provided to each element to provide various lock screens when the display 151 is rolled out. The fifth embodiment of the present invention may be implemented on the basis of the above-described first, second and third embodiments.

FIGS. 16A to 17B are diagrams for describing an example in which a control method of a mobile terminal according to a sixth embodiment of the present invention is implemented. According to the sixth embodiment of the present invention, the user can roll out the display 151 using both hands. For example, the user can input an unlocking pattern with the left hand gripping the first housing 101 and the right hand gripping the second housing 103.

Figure 16A:
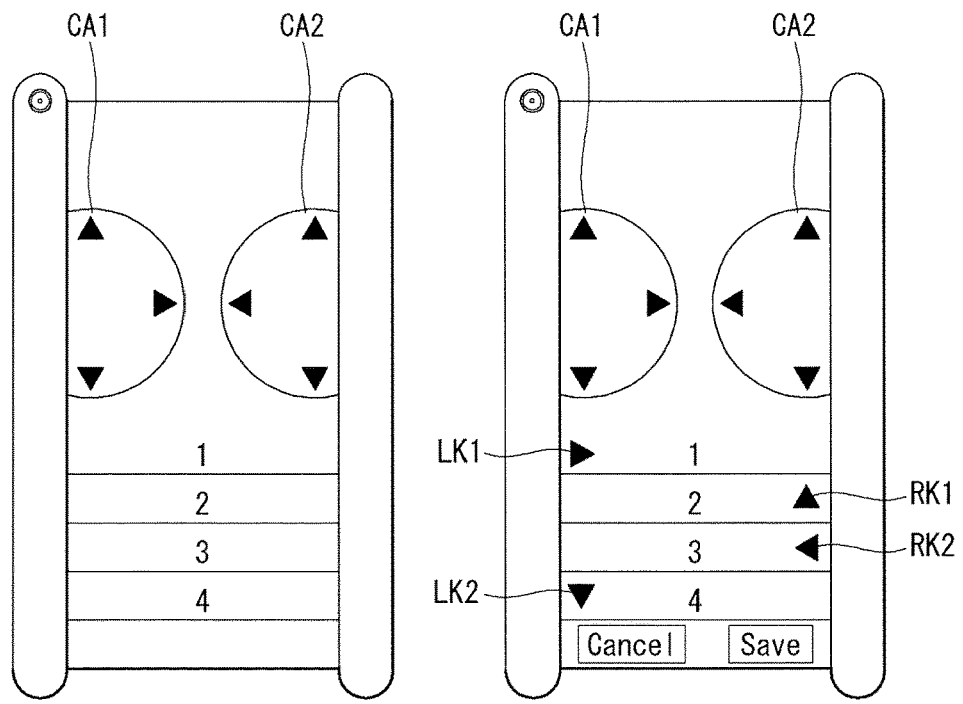

FIG. 16A shows a screen through which an unlocking pattern is set using both hands. Referring to FIG. 16A, the controller 180 can provide a first control area CA1 for control using the left hand and a second control area CA2 for control using the right hand to the display 151. The first control area CA1 and the second control area CA2 may include at least one direction key. When four lock codes are configured, an unlocking pattern using both hands may be set by selecting a right key LK1 of the first control area CA1 with the first code, selecting an up key RK1 of the second control area CA2 with the second code, selecting a left key RK2 of the second control area CA2 with the third code and selecting a down key LK2 of the first control area CA1 with the fourth code.

Figure 16B:
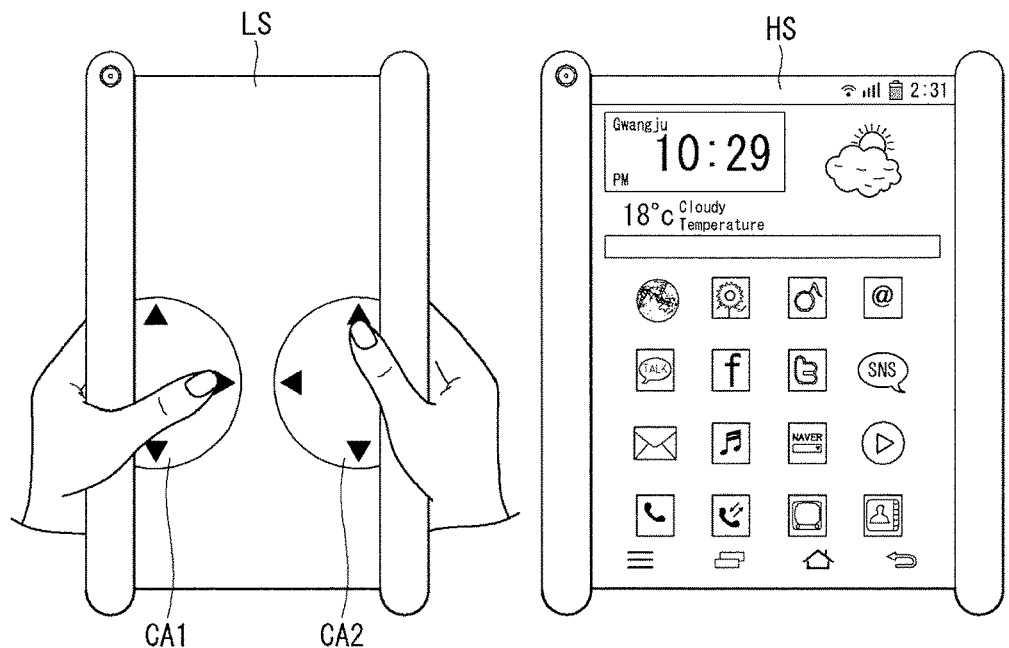

Referring to FIG. 16B, the controller 180 can release the locked state and display a home screen HS on the display 151 when the direction keys on the control areas corresponding to the unlocking pattern set in FIG. 16A are sequentially input in a state in which the lock screen LS including the first control area CA1 and the second control area CA2 positioned at the left and right sides of the display 151 is displayed.

The sizes and/or positions of the first control area CA1 and the second control area CA2 in the lock screen may be changed according to positions of both hands of the user. Although an example of releasing a locked state using both hands of the user through control areas in the form of a joystick having direction keys has been described with reference to FIGS. 16A and 16B, the present invention is not limited thereto.

Figure 17B:
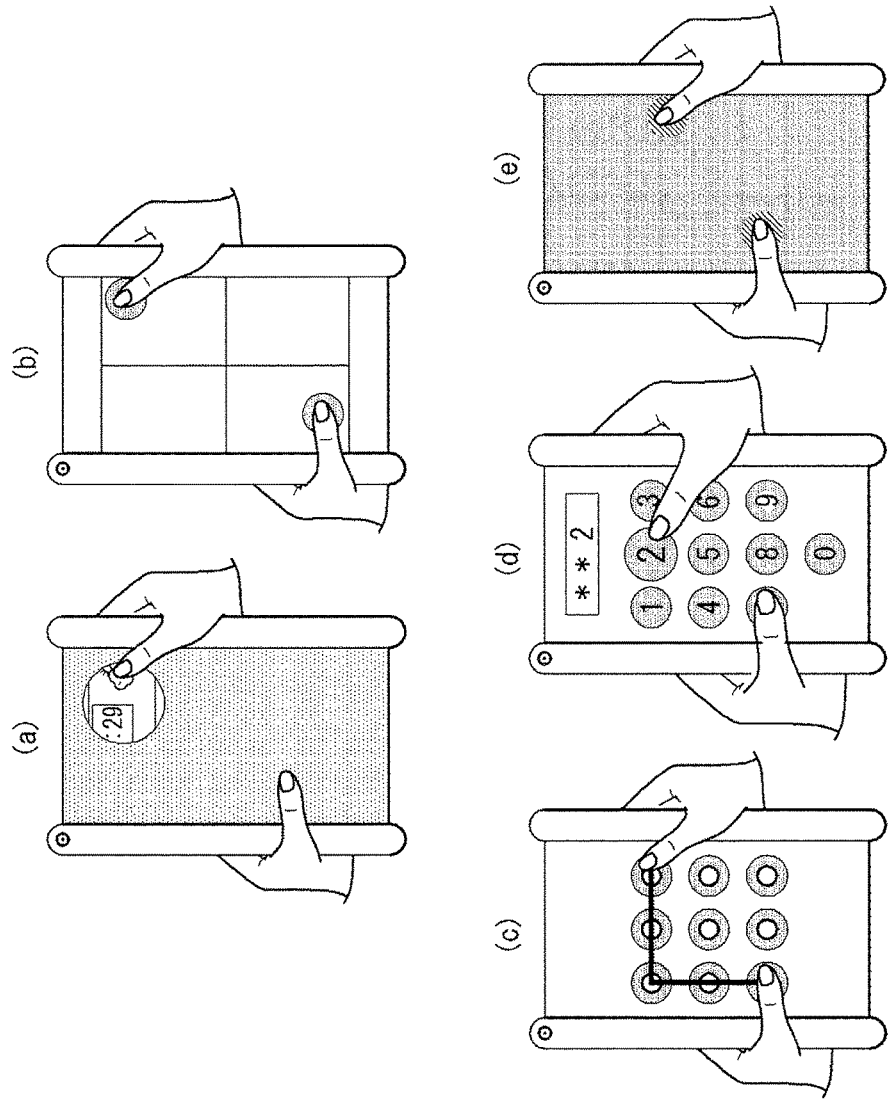

For example, referring to FIGS. 17A and 17B, the controller 180 can provide the aforementioned notification view screen NS when the display 151 is rolled out from the closed state by the first distance. The controller 180 provides a lock screen LS which can be released by both hands when the display 151 is rolled out beyond the first distance. The lock screen LS may be set to a range that both thumbs can reach. FIG. 17B illustrates various embodiments of releasing a locked state with both hands through the mobile terminal 100 according to an embodiment of the present invention.

For example, (a) shows a method of releasing the locked state by sliding the current page with one hand. (b) shows a method of releasing the locked state through a plurality of touch inputs sequentially input to at least one of a plurality of virtual areas using both hands according to a preset pattern. (c) shows a method of releasing the locked state through touch inputs connected in a preset order for a plurality of figures arranged in a first composition. (d) shows a method of releasing the locked state by inputting preset codes (numbers) through a key pad. (e) shows a method of releasing the locked state by recognizing the fingerprint of the user through a touch input applied to a point on the display 151. All the methods (a) to (e) are based on the assumption that a lock screen is provided in a state in which the rollable display is rolled out by a predetermined distance or longer and the locked state is released through an unlocking pattern input through the lock screen.

Figure 18A:
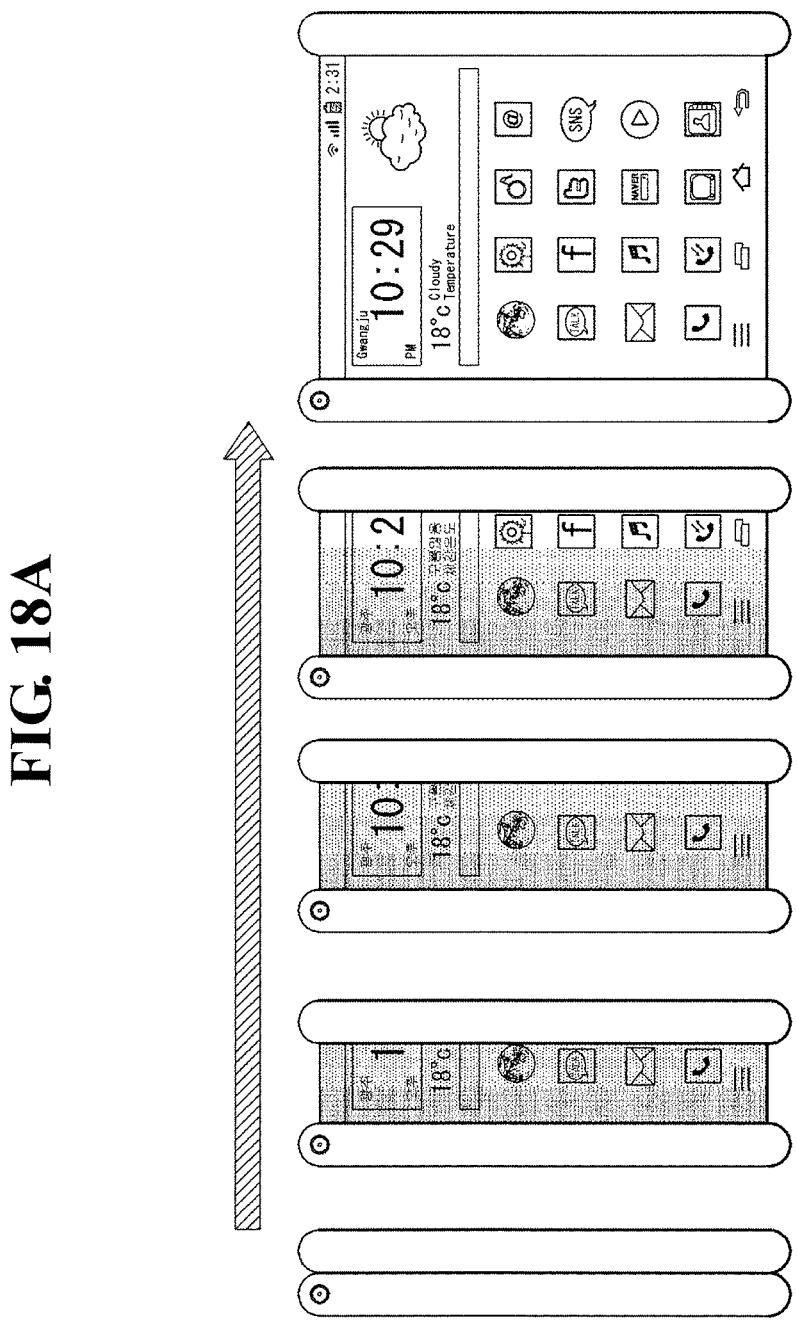
FIGS. 18A and 18B are diagrams illustrating an example in which display properties of a display vary while a locked state is released according to an embodiment of the present invention.
Figure 18B:
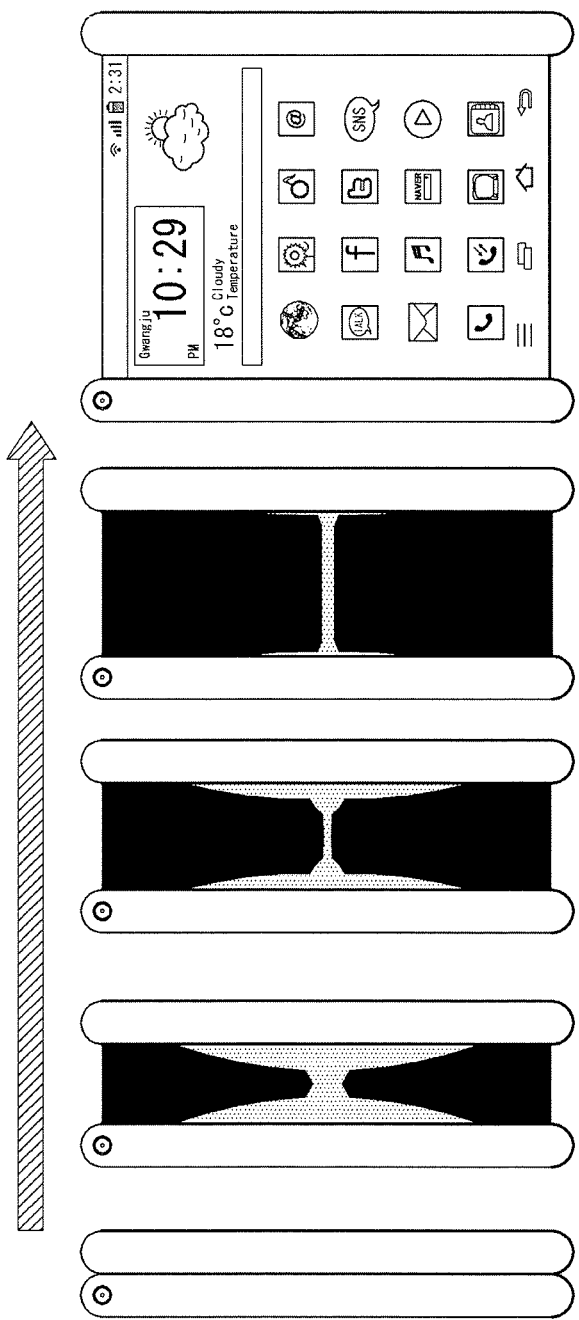

FIGS. 18A and 18B are diagrams illustrating an example in which display properties of a display are changed during release of a locked state according to an embodiment of the present invention. For example, referring to FIG. 18A, the controller 180 can discontinuously control the transparency of a display which is discontinuously rolled out according to a preset unlocking pattern. That is, the transparent can be increased when the display is rolled out by a longer distance and can be decreased when the display is rolled out by a shorter distance. In addition, referring to FIG. 18B, when the display is fully rolled out and thus the locked state is released, a visual cue for providing specific animation effects during rolling out of the display such that a normal unlocking screen is not displayed and ending the animation effects when the display is fully rolled out may be provided.

Control methods that can be implemented in the mobile terminal configured as above and embodiments related thereto have been described with reference to the attached drawings. The present invention may be embodied in other specific forms without departing from the scope and features thereof.

The present invention may be implemented as computer-readable code in a medium in which programs are stored. Examples of possible computer-readable media include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The invention claimed is:

1. A mobile terminal comprising:
a rollable display;
a first housing supporting a first end of the display and a second housing supporting a second end of the display;
a sensing unit configured to sense variations in rolling of the display according to a distance between the first housing and the second housing; and
a controller configured to:
release a locked state of the display when an input pattern matching a predetermined unlocking pattern is input while the display is rolled out from the first housing,
wherein the state in which the display is fully rolled up is a state in which the first housing and the second housing are in contact with each other and the display is not exposed to the outside, and
wherein the controller is configured to display at least one application icon having notification information on the display when the display is rolled out from the first housing by a first predetermined distance, and display a screen through which an unlocking input pattern will be input on the display when the display is additionally rolled out beyond the first predetermined distance.

2. The mobile terminal according to claim 1, wherein, in response to a selection of the at least one application icon, the controller is configured to display a screen provided by the selected application icon on the display in the released locked state.

3. The mobile terminal according to claim 1, wherein the display includes virtual areas arranged in a row, and the sensed input pattern includes a plurality of touch inputs sequentially touching at least one of the virtual areas in a predetermined order while the display is discontinuously rolled out from the first housing a predetermined number of times.

4. The mobile terminal according to claim 3, wherein the predetermined unlocking pattern is defined by the order of touching the virtual areas according to a rolling distance of the display, and
wherein the order is preset through a user input.

5. The mobile terminal according to claim 3, wherein the number of virtual areas is the same as the predetermined number of times of discontinuously rolling out the display from the first housing.

6. The mobile terminal according to claim 1, wherein the predetermined unlocking pattern includes a plurality of rolling patterns sensed when the display is discontinuously rolled, and
wherein the plurality of rolling patterns is defined by a combination of a rolling distance, a rolling direction and the number of times of rolling.

7. The mobile terminal according to claim 6, wherein the combination further includes a rolling speed.

8. The mobile terminal according to claim 6, wherein, when each of the plurality of rolling patterns matches the predetermined unlocking pattern, the controller is configured to output a feedback signal when each rolling pattern is sensed.

9. The mobile terminal according to claim 8, wherein the feedback signal includes at least one of a vibration signal, a sound signal and an optical signal.

10. The mobile terminal according to claim 6, wherein, when the display is rolled out by a predetermined distance in a closed state in which the display is fully rolled up and accommodated in the first housing, the controller is configured to display one or more application icons arranged in a row on the display, and
wherein when the locked state is released by the plurality of rolling patterns while a specific application icon is selected, the controller is configured to display an execution screen with respect to the selected specific application icon on the display.

11. The mobile terminal according to claim 1, wherein the display further comprises a fingerprint recognition sensor, and
wherein the controller is configured to release the locked state upon sensing rolling out of the display even if the input pattern for releasing the locked state is not received after acquisition of fingerprint information through the fingerprint recognition sensor, and to control the mobile terminal to operate in a user-only accessible mode.

12. The mobile terminal according to claim 1, wherein the controller is configured to:
display a user interface for receiving the input pattern for releasing the locked state on the display, and
release the locked state when the unlocking pattern is input through the user interface.

13. The mobile terminal according to claim 12, further comprising a grip sensing unit,
wherein the controller is configured to sense a position of a hand gripping the first housing and the second housing through the grip sensing unit and to control a display position of the user interface such that the unlocking pattern can be input by the hand.

14. The mobile terminal according to claim 1, wherein the input pattern is defined by a plurality of touch inputs applied to at least one graphical object continuously exposed in a row direction when the display is rolled out.

15. The mobile terminal according to claim 1, wherein the display switches from one of a closed state in which the display is fully rolled up and accommodated in the first housing, an opened state in which the display is fully rolled out, and an intermediate state between the opened state and the closed state, and
wherein the controller is configured to sense the input pattern for releasing the locked state in the intermediate state.

16. The mobile terminal according to claim 1, wherein the first housing further includes a roll on which the display is rolled.

17. The mobile terminal according to claim 1, wherein a touch sensing panel is integrated into the display.

18. A method of controlling a mobile terminal including a rollable display; a first housing supporting a first end of the display and a second housing supporting a second end of the display; and a sensing unit configured to sense variations in rolling of the display according to a distance between the first housing and the second housing, the method comprising:
releasing, via a controller, a locked state of the display when an input pattern matching a predetermined unlocking pattern is input while the display is rolled out from the first housing,
wherein the state in which the display is fully rolled up is a state in which the first housing and the second housing are in contact with each other and the display is not exposed to the outside, and
wherein the method further comprises:
displaying at least one application icon having notification information on the display when the display is rolled out from the first housing by a first predetermined distance, and displaying a screen through which an unlocking input pattern will be input on the display when the display is additionally rolled out beyond the predetermined first distance.

* * * * *